Dec. 13, 1966 R. C. VAN SICKLE 3,291,947

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964 17 Sheets-Sheet 1

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964

INVENTOR
Roswell C. VanSickle
BY
Willard R. Crout
ATTORNEY

Dec. 13, 1966 R. C. VAN SICKLE 3,291,947

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964 17 Sheets-Sheet 4

Dec. 13, 1966 R. C. VAN SICKLE 3,291,947

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964 17 Sheets-Sheet 5

Dec. 13, 1966 R. C. VAN SICKLE 3,291,947

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964 17 Sheets-Sheet 6

Dec. 13, 1966 R. C. VAN SICKLE 3,291,947

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964 17 Sheets-Sheet 8

Dec. 13, 1966 R. C. VAN SICKLE 3,291,947

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964 17 Sheets-Sheet 9

Dec. 13, 1966 R. C. VAN SICKLE 3,291,947

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964

17 Sheets-Sheet 10

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964

Dec. 13, 1966 R. C. VAN SICKLE 3,291,947

INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Filed June 12, 1964 17 Sheets-Sheet 16

United States Patent Office 3,291,947
Patented Dec. 13, 1966

3,291,947
INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY

Roswell C. Van Sickle, Wilkinsburg, Pa., assignor to Westinghouse Electric Corporation, Pittsburgh, Pa., a corporation of Pennsylvania Filed June 12, 1964, Ser. No. 374,708
16 Claims. (Cl. 200—148)

This invention relates generally to interrupting structures and operating mechanisms for compressed-gas circuit interrupters and, more particularly, to improved and highly-efficient compressed-gas circuit interrupters suitable for use over a wide voltage and current range.

A general object of the present invention is the provision of an improved compressed-gas circuit interrupter adaptable for high-speed operation, and suitable for multiple-series use in the higher-voltage ranges.

Another object of the present invention is the provision of an improved interrupting head for a high-voltage line of compressed-gas circuit interrupters.

Still a further object of the present invention is the provision of a high-speed compressed-gas circuit interrupter of the type utilizing two breaks in series, in which the inertia of the rotating, or moving parts is maintained at a minimum.

Another object of the present invention is the provision of an improved compressed-gas circuit interrupter utilizing a highly-efficient blast-valve mechanism, the latter being disposed at a highly strategic location relative to the two interrupting units to result in a minimum of elapsed time prior to the ejection of a blast of arc-extinguishing gas into the region between the separated contact structure during the opening operation.

Still a further object of the present invention is the provision of an improved compressed-gas circuit interrupter of the rotating cross-arm type in which the rotating hub assembly has associated therewith a novel blast-valve mechanism.

Another object of the present invention is the provision of an improved modular compressed-gas interrupting head, which is suitable, in multiple series arrangements, for the higher-voltage ranges.

Still a further object of the present invention is the provision of an improved circuit interrupter in which an impedance means, such as a resistor, is inserted into series circuit only during the closing operation of the circuit interrupter to damp the accompanying voltage surges on the line. This has the important advantage that voltage surges on the line are damped on closing, but yet a fast interrupting time, such as two-cycle operation for complete clearing of the circuit, is achieved by the elimination of a two-step opening operation with a resistor.

Still a further object of the present invention is the provision of an improved voltage-dividing means associated with a multiple series-break type of circuit interrupter.

Another object of the present invention is the provision of an improved resistor assemblage conveniently and compactly located relative to interiorly-extending terminal bushings protruding into a substantially enclosed interrupting head.

Another object of the present invention is the provision of an improved simplified-type of compressed-gas interrupting head in which maintenance operations are easily and readily achieved, and in which the inertia of the moving parts is maintained at a minimum.

Another object of the present invention is the provision of an improved compressed-gas interrupting assemblage involving a pair of serially-related breaks, in which each break has associated therewith a novel orifice construction, and in which double-venting action is achieved during circuit interruption.

In U.S. patent application filed June 8, 1964, Serial No. 373,150 by Robert G. Colclaser, Jr., and Frank L. Reese, and assigned to the assignee of the instant application, there is disclosed and described a high-voltage compressed-gas circuit interrupter in which a rotating operating-rod construction is utilized in connection with a pair of serially-related interrupting units disposed within a surrounding tank structure. In the aforesaid patent application, rotation of the operating rod not only achieves, through rotating action, separation at the contact structures of the pair of serially-related interrupting units, but, in addition, compressed gas is caused to flow through the rotating operating rod and radially outwardly through the pair of tubular movable contacts. It is a further object of the present invention to improve upon the interrupting construction set forth in the aforesaid patent application, rendering it more suitable for multiple modular use and, in addition, rendering more compact the parts associated therewith.

Further objects and advantages will readily become apparent upon reading the following specification, taken in conjunction with the drawings, in which.

Figure 1:
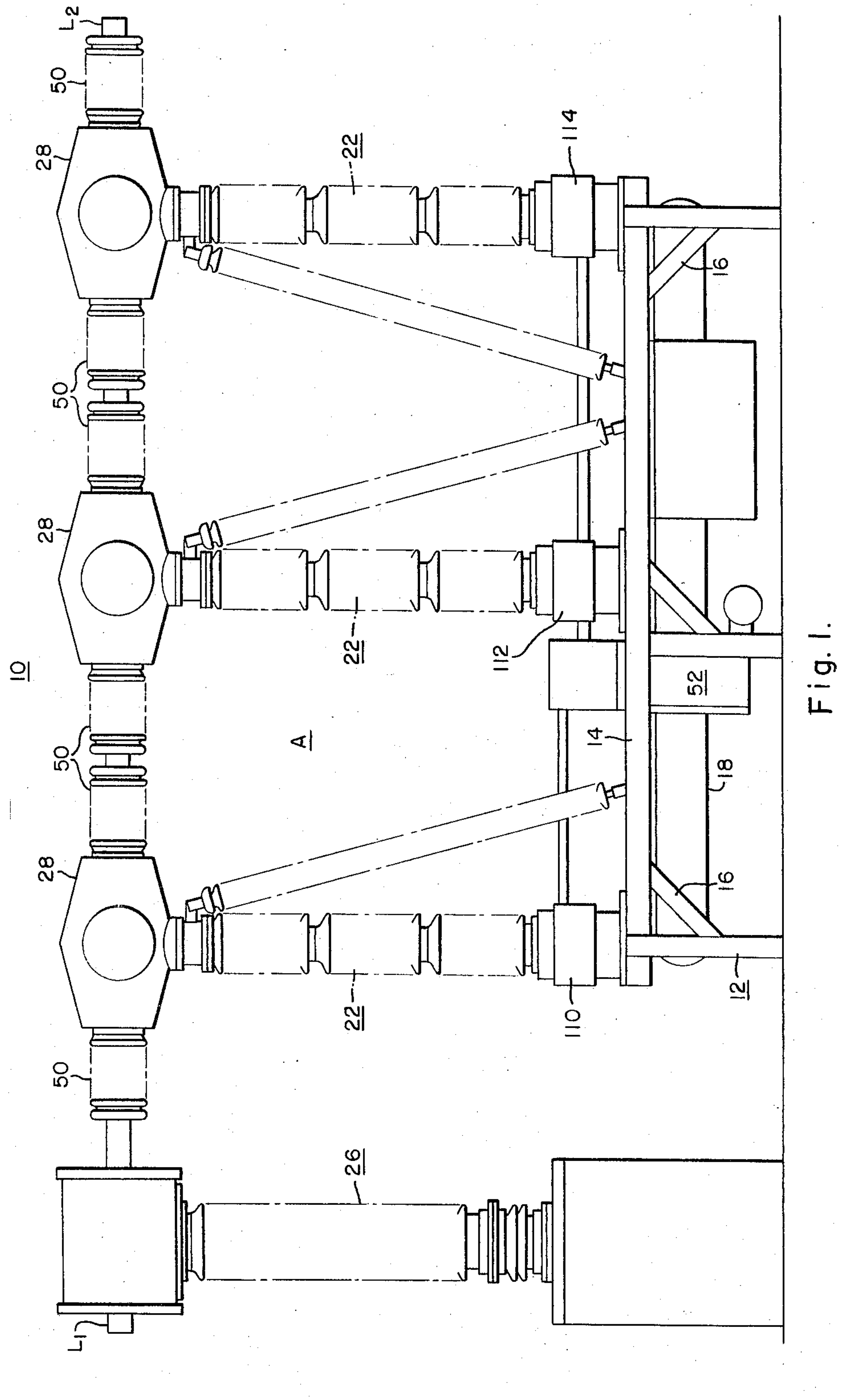
FIGURE 1 is a side elevational view of a three-phase high-voltage compressed-gas circuit interrupter embodying the principles of the present invention.
Figure 2:
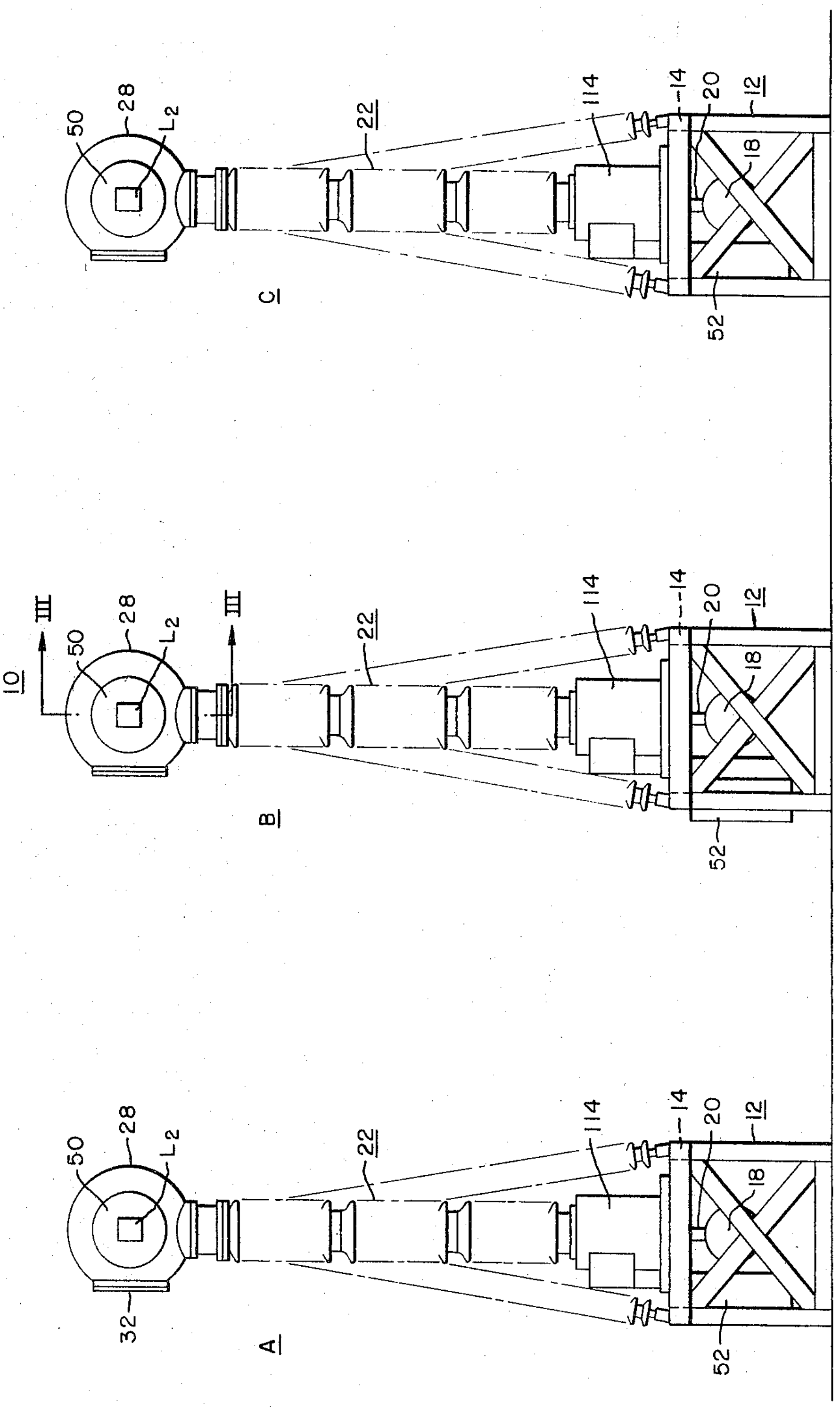
FIG. 2 is an end elevational view of the three-phase circuit interrupter illustrated in FIG. 1.

With reference to FIGS. 1 and 2 of the drawings, it will be noted that there is shown a high-voltage three-phase compressed-gas circuit interrupter 10 including pole-units A, B and C. The pole units are alike except for the interpole electrical control wiring, gas lines and air lines and for the house on the middle pole which contains the common parts of the air and gas systems. Each pole-unit A, B or C is mounted upon a heavy grounded supporting frame 12 comprising heavy longitudinally-extending beam members 14 and angularly braced supports 16. In addition, each supporting frame 12 preferably has a longitudinally-extending high-pressure main reservoir tank 18 associated therewith, extending in generally parallel relationship, having individual supply pipes 20 extending upwardly therefrom into three insulating upstanding column structures 22 to supply high-pressure gas to auxiliary high-pressure reservoir chambers 24 at high potential, as more particularly described hereinafter.

Associated with each pole-unit A, B or C is an upstanding current-transformer assembly or structure 26, which is utilized to measure the current flow through the pole-unit. Since the current-transformer structure 26 constitutes no part of the present invention, and the internal structure thereof is well understood by those skilled in the art, it will not be described. Reference may, however, be made to U.S. Patent 2,504,647 for a description of a typical gas-filled type of current transformer, which could be used.

Figure 3:
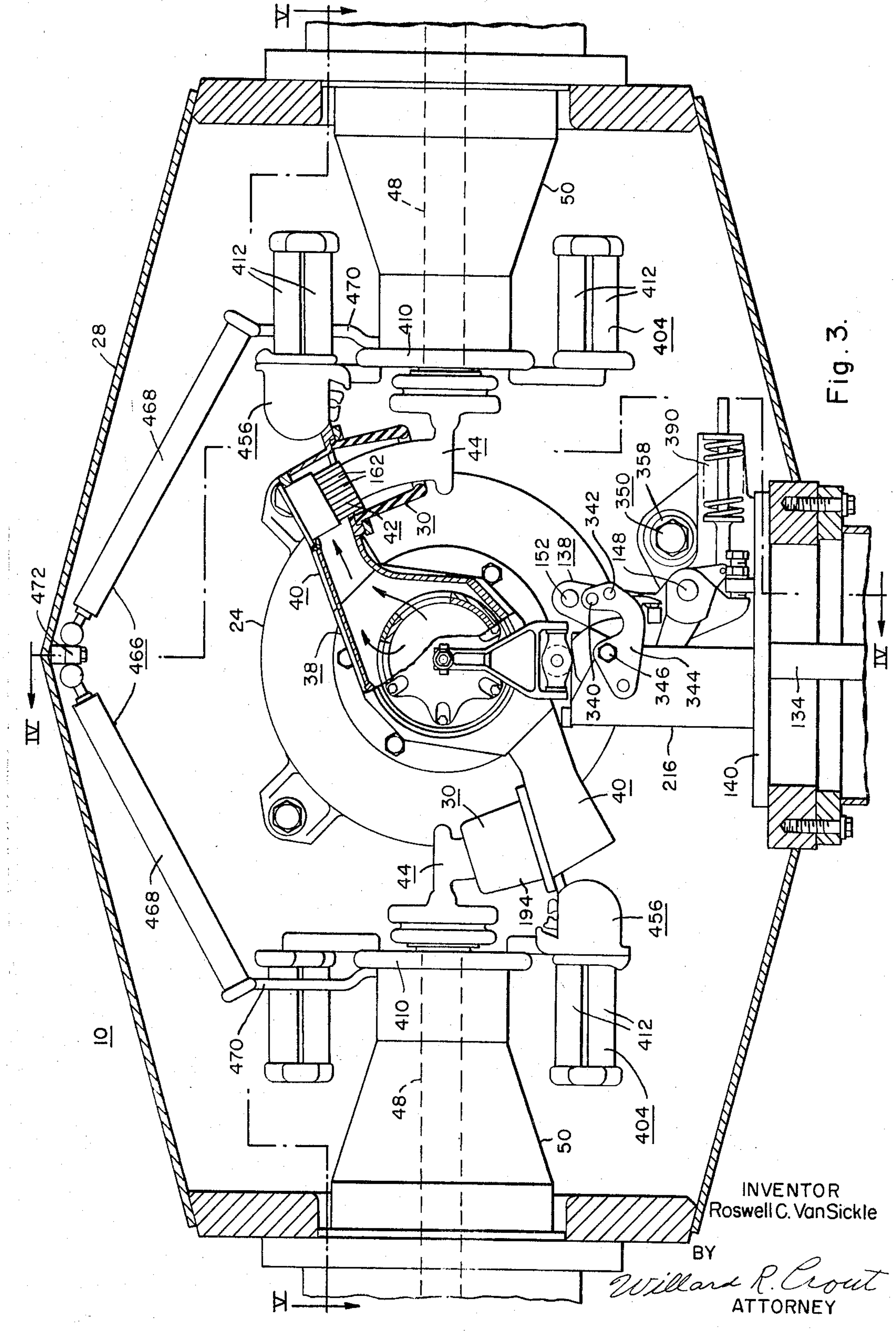
FIG. 3 is a vertical sectional view taken through one of the modular interrupting heads of one of the pole-units of the circuit interrupter of FIGS. 1 and 2, taken substantially along the line III—III of FIG. 2, with the separable contact structure being illustrated in the closed-circuit position.
Figure 6:
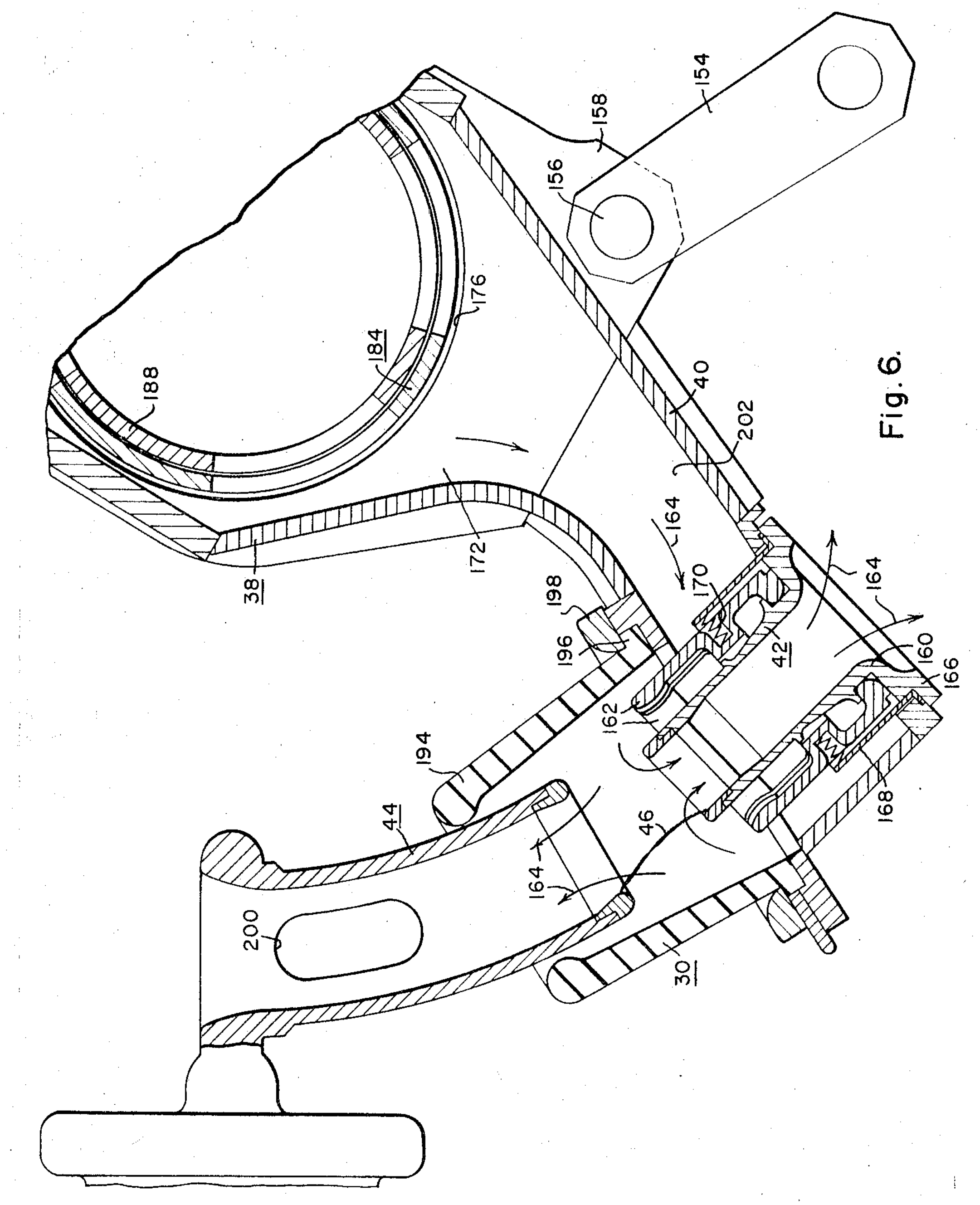
FIG. 6 is an enlarged fragmentary vertical sectional view, somewhat similar to that of FIG. 3, but showing the disposition of several detailed contact parts in the partially-open position.

As shown in FIGS. 1 and 2, surmounted upon the insulating column structures 22 are live metallic exhaust housings, or interrupting head-units 28 at high potential, interiorly of each of which is a pair of serially-related arc-extinguishing units 30, more particularly illustrated in FIGS. 3 and 6 of the drawings.

Figure 5:
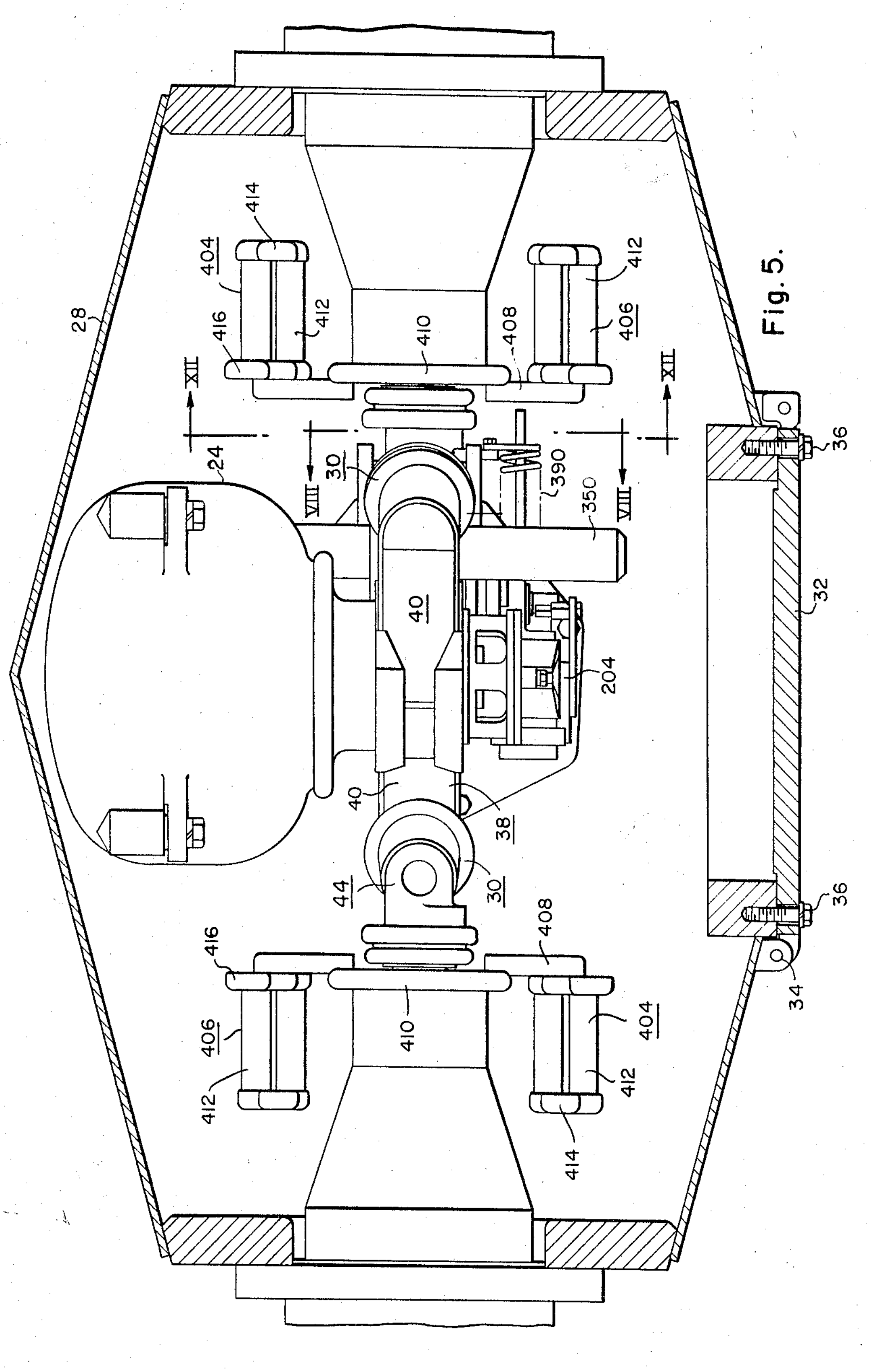
FIG. 5 is a horizontal sectional view taken substantially along the line V—V of FIGS. 3 and 4.

An inspection door 32 (FIG. 5), pivotally supported upon hinge pins 34, may be secured by bolts 36, as shown in FIG. 5, to form a gas-tight closure for the head-unit 28.

With respect to FIG. 3 of the drawings, it will be noted that each interrupting head-unit 28 comprises a rotating bridging contact cross-arm assembly, generally designated by the reference numeral 38, and including a pair of radially outwardly-extending gas-conducting arms 40 carrying movable contacts 42. Each movable contact 42 separates from a relatively stationary contact structure 44 to establish an arc 46 (FIG. 6), which is extinguished by an intensive gas flow, as more fully described hereinafter. The stationary contacts 44 are supported and clamped to terminal studs 48 extending through terminal bushings 50, the latter protruding through the ends of the interrupting head-units 28. Generally, the circuit-interrupting structure 10 operates, during the opening and closing operations, so as to effect rotation of the several cross-arm assemblies 38 to consequently bring about a closing, or alternatively, an interruption of the electrical circuit $L_1L_2$ through the circuit interrupter 10.

Figure 32:
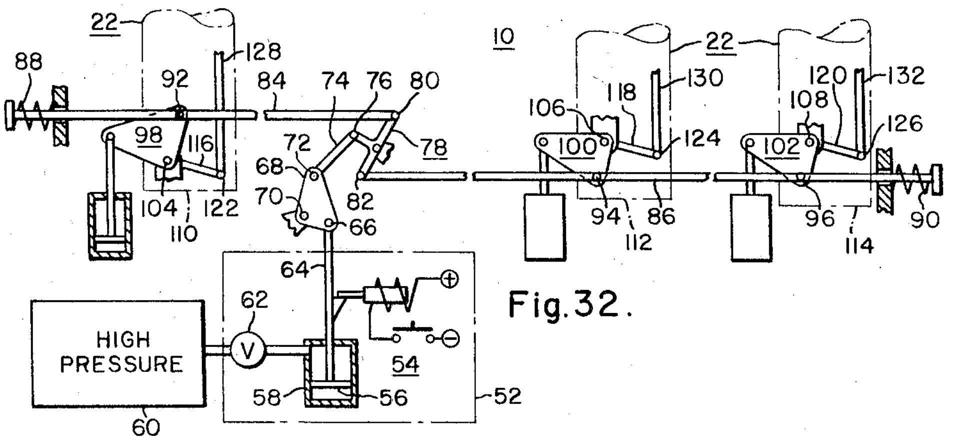
FIG. 32 is a somewhat simplified diagrammatic view of the operating linkage at the base of one of the pole-units of the present invention.

With reference to FIG. 32 of the drawings, it will be noted that there is provided a mechanism compartment 52 containing a suitable operating mechanism 54. The operating mechanism 54 constitutes no part of the present invention, and may be a hydraulic type, pneumatic type or a solenoid mechanism, as desired. The mechanism 54 is herein illustrated as of a pneumatic type comprising a pneumatic piston 56 reciprocally operable within an operating cylinder 58. The entrance of high-pressure gas, such as compressed air, for example, from a reservoir tank 60, as controlled by a closing valve 62, diagrammatically illustrated, effects downward closing movement of the pneumatic piston 56, and hence closing of the interrupter 10. There are three such mechanisms 54 supplied for the three pole-units A, B and C due to the size and weight of the interrupter 10, which is suitable for 500 kv. service at an interrupting capacity of 35,000 mva. The three operating mechanisms 54 are synchronously controlled by electrical means. Reference may be had to United States Patent 2,917,602, issued December 15, 1959, to R. C. Van Sickle for a typical pneumatic mechanism adaptable for reclosing service. The operating mechanism 54 is such as to effect downward closing movement of an operating rod 64, the latter being pivotally connected, as at 66, to a main operating crank 68. The operating crank 68 is pivotally mounted upon a fixed operating shaft 70. Pivotally connected, as at 72, to this operating crank 68 is a floating link 74, which is also pivotally connected, as at 76, to a double-ended crank-arm assembly 78. The double-ended crank-arm assembly 78 is pivotally connected, as at 80 and 82, to two horizontally-extending operating rods 84 and 86. The horizontal operating rods 84, 86 have accelerating spring assemblies 88, 90 which supply energy for moving them to the open position. The horizontal operating rods 84, 86 are pivotally connected, as at 92, 94 and 96, to three crank-arms 98, 100 and 102, which are affixed to three horizontally-extending main drive shafts 104, 106 and 108. The drive shafts 104, 106 and 108 rotatably pass through gas-tight seals into lower column housings 110, 112 and 114 disposed at the lower ends of the three insulating column structures 22.

Disposed interiorly within the lower column housings 110, 112 and 114 are operating cranks 116, 118 and 120, which, in turn, are pivotally connected, as at 122, 124 and 126, to the lower ends of vertically-extending and reciprocally-moving insulating operating rods 128, 130 and 132. The upper ends of the three insulating operating rods 128, 130 and 132 have metallic rod-ends 134 (FIG. 10), which, in turn, are pivotally connected, as at 136, to main bifurcated operating lever portions 138*a*, more particularly shown in FIGS. 24–27 of the drawings, and constituting integral portions of crank-arm assemblies, generally designated by the reference numeral 138. Each crank-arm assembly 138 has operating arm portions, more fully described hereinafter, and translates vertical reciprocal movement of the insulating operating rods 128, 130 and 132 into rotating contact motion and blast-valve operation, as more fully described hereinafter.

Figures 26, 27, 30:
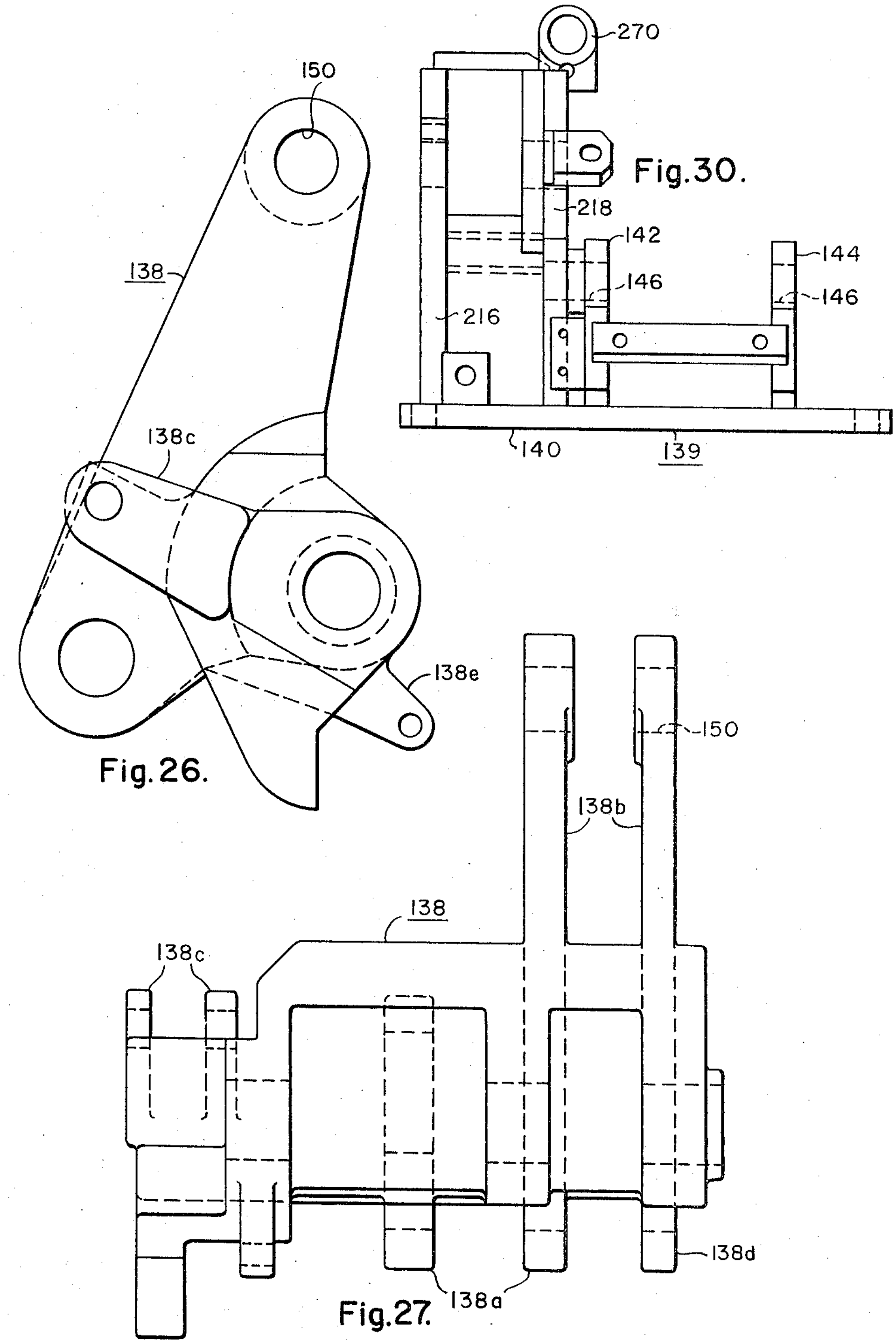
FIG. 26 is an end elevational view of the main operating lever of FIGS. 24 and 25.
FIG. 27 is a top plan view of the main operating lever of FIGS. 24–26.
FIG. 30 is an end elevational view of the main stationary support frame of FIGS. 28 and 29.
Figure 28:
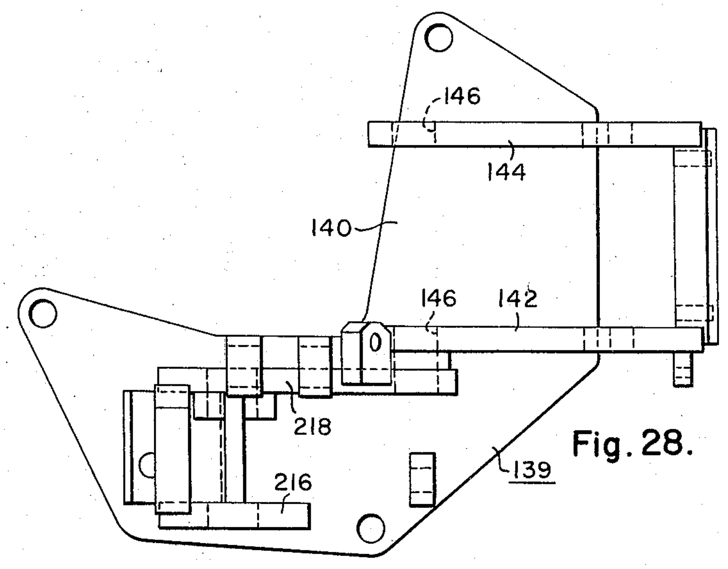
FIG. 28 is a top plan view of the main stationary support frame for the modular interrupting head of FIG. 3.
Figure 29:
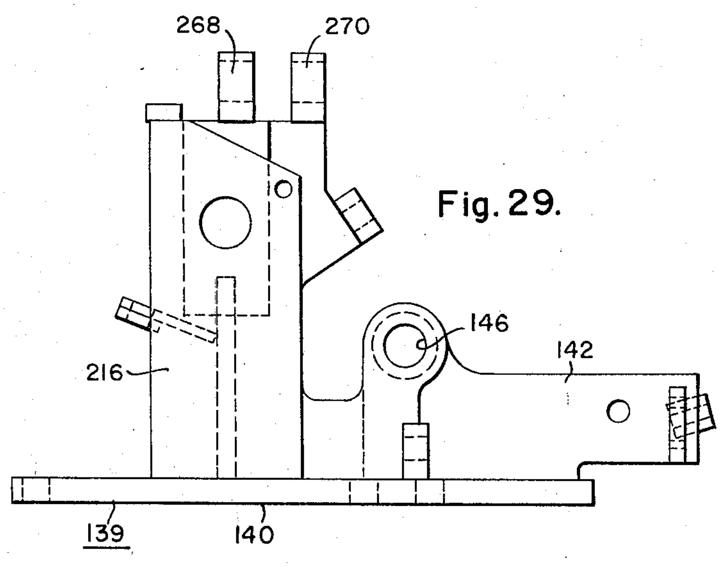
FIG. 29 is a side elevational view of the main stationary frame support of FIG. 28.

Provided interiorly within each of the interrupting heads 28, and fixedly secured to it, is a stationary main frame support 139, more particularly shown in FIGS. 28–30 of the drawings. As shown in FIGS. 28–30, the main supporting frame 139 comprises a heavy supporting base plate 140 and upstanding supports 142, 144 rigidly fastened thereto, as by welding, to form journal portions 146 for accommodating a main operating shaft 148. The main crank-arm assembly 138, more particularly illustrated in FIGS. 24–27 of the drawings, is pivotally mounted upon the main operating shaft 148. The main crank-arm assembly 138 has a bifurcated integral arm portion 138*b* with apertures 150 extending through the outer free ends thereof to accommodate a pivot pin 152, the latter being pivotally connected to a floating link 154, which, in turn, is pivotally connected by a pin 156 (FIG. 6) extending through an off-standing bifurcated operating arm portion 158 of the bridging contact cross-arm assembly 38.

With reference to FIGS. 3 and 6 of the drawings, it will be noted that each bridging contact cross-arm assembly 38 comprises the pair of radially outwardly-extending gas-conducting moving contact arms 40, to the outer free ends of which are secured the movable contact structures 42. Each movable contact structure 42 comprises a movable tubular arcing horn 160 and a plurality of surrounding circumferentially-disposed spring-biased main contact fingers 162. The main spring-biased contact fingers 162 conductively engage with the outer sides of the stationary tubular contact structure 44, more clearly illustrated in FIG. 6 of the drawings.

During the opening operation, the main contact fingers 162 are first separated from the outer sides of the tubular main stationary contact 44 to effect arc establishment 46 (FIG. 6) between the movable tubular arcing horn 160 and the stationary tubular contact 44 thereby preventing arc erosion at the main movable contact fingers 162. Arc extinction takes place as a result of a double venting blast action, as illustrated more clearly by the gas-flow arrows 164 in FIG. 6 of the drawings, and as described in more detail hereinafter. As shown, the movable contact structure 42 comprises the movable tubular arcing horn 160 having a flanged base portion 166 secured by means, not shown, to the outer extremity of the gas-conducting contact arm 40 of the contact bridging cross-arm assembly 38. In addition, a cylindrically-shaped spring seat retainer 168 accommodates the outer ends of a plurality of contact biasing springs 170, which serve to bias the contact fingers 162 radially inwardly into good contacting engagement with the stationary tubular main contact 44.

Figures 7, 7A:
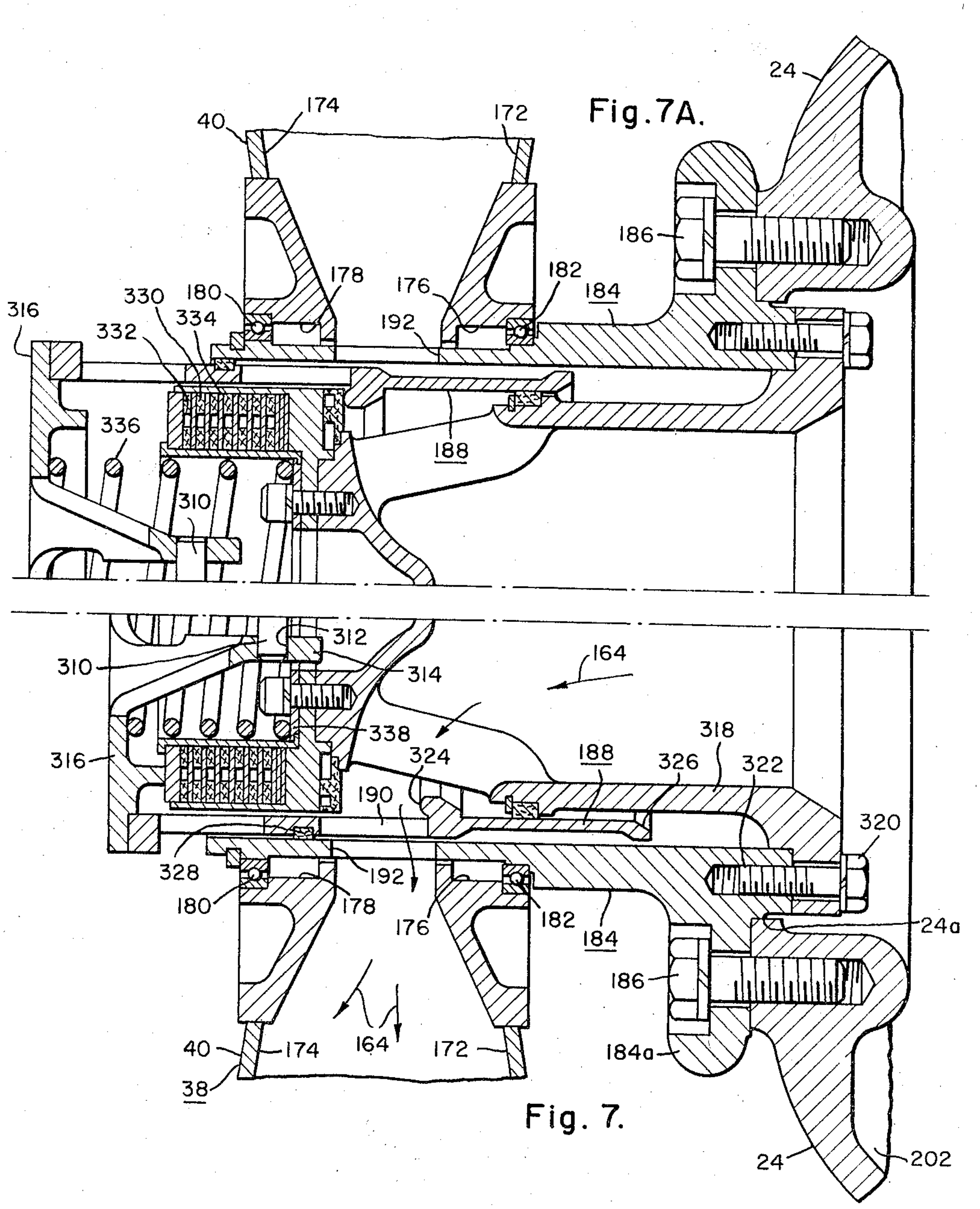
FIG. 7 is an enlarged fragmentary view of the blast-valve showing the open position thereof, taken substantially along the line VII—VII of FIG. 4.
FIG. 7A is a view similar to that of FIG. 7, but showing the blast-valve in the closed position thereof.

As shown more clearly in FIGS. 6 and 7 of the drawings, the rotatable cross-arm assembly 38 includes a pair of spaced side plates 172, 174 having journal openings 176, 178 provided therein, which, in conjunction with bearings 180, 182 (FIG. 7), serve to rotatably support the cross-arm assembly 38 on an apertured bearing and blast-valve support generally designated by the reference numeral 184. The apertured bearing support 184, as shown in FIGS. 7, 7A, is fixedly secured by bolts 186 to the auxiliary reservoir chamber 24. During the opening operation, opening of a cylindrically-shaped blast-valve 188, as shown in FIG. 7, will permit the blasting of high-pressure arc-extinguishing gas, such as sulfur-hexafluoride ($SF_6$) gas from the auxiliary gas reservoir 24, out through openings 190 provided in the side guide-wall portion of the blast-valve 188, and through openings 192 provided in the bearing and blast-valve support 184, through the gas-conducting arms 40 and toward the inter-contact region to effect extinction of the established arc 46.

Preferably, in order to effect more accurate guiding of the gas blast, an insulating orifice structure 194 is provided, being movable with the movable contact structure 42 to effect a directional flow of the compressed gas through the vented moving and stationary contacts 42, 44, as shown in FIG. 6 of the drawings. In more detail, the orifice structure 194 has a mounting flange portion 196, which is clamped by a clamping ring 198 to the end of each rotating arm 40. Each stationary tubular arcing contact 44 has a plurality of venting slots 200 provided therein to assist in venting of the compressed arc-extinguishing gas 202.

Figure 4:
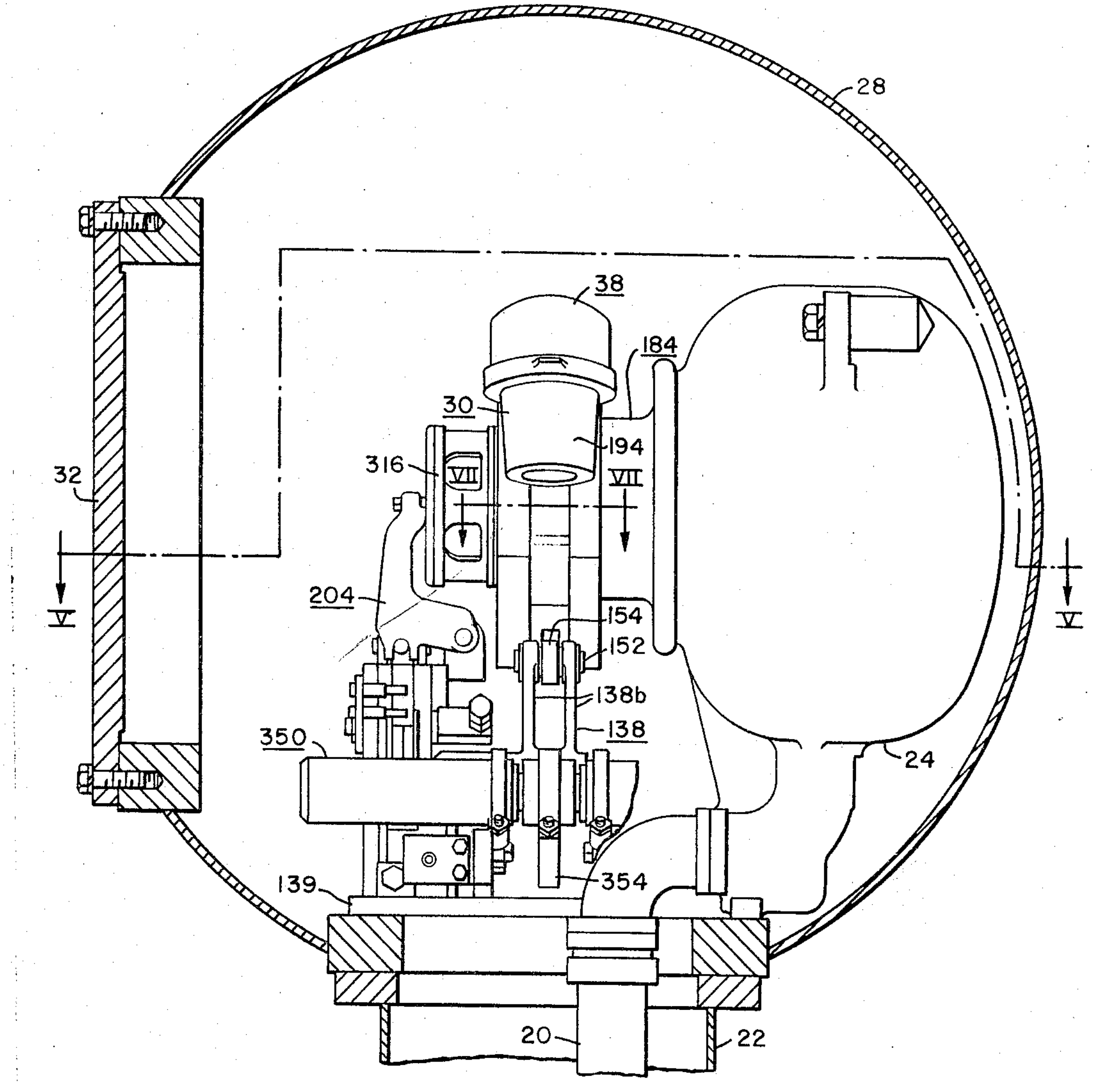
FIG. 4 is a vertical sectional view taken substantially along the line IV—IV of FIG. 3 with the resistor and voltage-dividing assembly omitted for clarity.

*Blast-value operating linkage (FIGS. 4, 8)*

Figure 18:
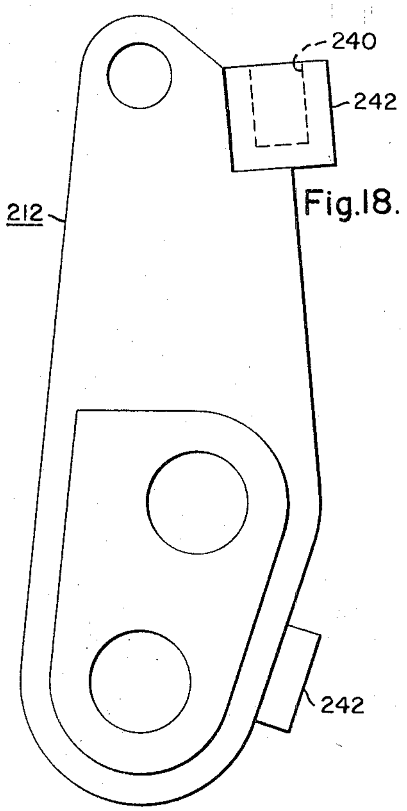
FIG. 18 is a side elevational view of a blast-valve cam-operating lever.
Figure 19:
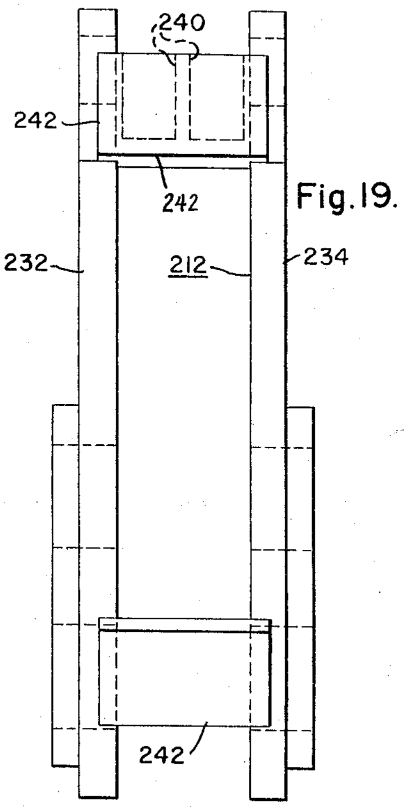
FIG. 19 is a side elevational view of the blast-valve cam-operating lever of FIG. 18.
Figure 22:
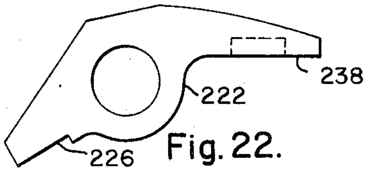
FIG. 22 is a side elevational view of one of the releasable blast-valve dogs.
Figure 23:
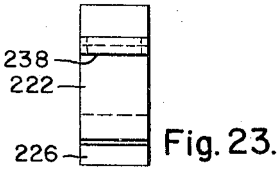
FIG. 23 is an end elevational view of the releasable blast-valve dog of FIG. 22.
Figure 25:
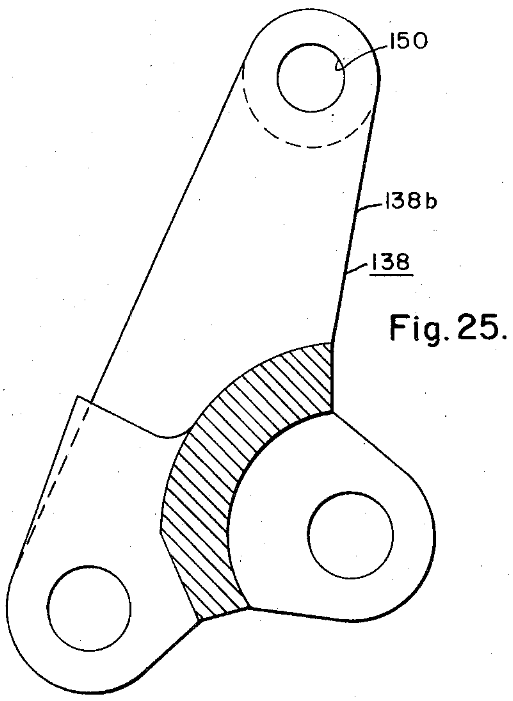
FIG. 25 is a sectional view taken substantially along the line XXV—XXV of FIG. 24.
Figure 24:
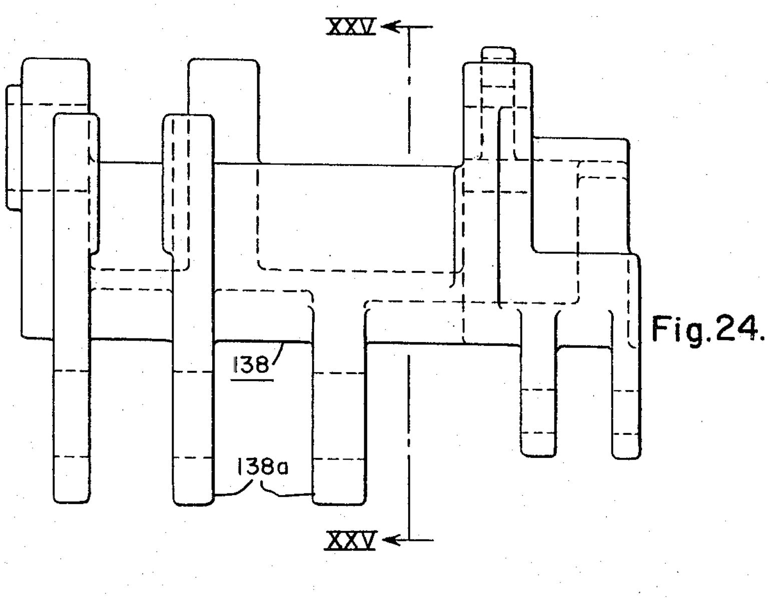
FIG. 24 is a side elevational view of the main operating lever for the modular interrupting head of FIG. 3.

The blast-valve operating linkage 204, in general, comprises the cam-actuated blast-valve 188, which functions to open and to permit a blasting of arc-extinguishing gas 202 only during the opening operation of the circuit interrupter 10. As shown more in detail in FIG. 9 of the drawings, the main operating crank-arm assembly 138 has a bifurcated arm portion 138*c* integrally formed therewith, which is pivotally connected by a pin 206 to a floating link 208, the latter, in turn, being pivotally connected by a pivot pin 210 to a double-armed blast-valve cam-operating lever 212 (FIG. 9 and FIG. 18) stationarily pivotally mounted upon a stationary pivot pin 214. The pivot pin 214 is journaled within upright stationary supports 216, 218 (FIG. 28) welded to the base plate 140 of the main frame support 139. Disposed between the outer ends of the double-armed blast-valve cam-operating lever 212, and pivotally mounted upon a pivot pin 220, is a pair of contiguously-disposed operating dogs, or latches 222, 224, which have different-length nose portions 226, which engage with teeth 228 provided at the outer free end of a blast-valve cam 230. The blast-valve cam 230 is shown more clearly in FIGS. 16 and 17 of the drawings, and is also pivotally mounted upon the pivot pin 214 between the furcations 232, 234 of the bifurcated blast-valve cam-operating lever 212. A pair of compression springs 236 (FIG. 9) are provided to bias the tail portions 238 of the operating latches 222, 224 into operating engagement with the teeth 228. In more detail, the compression springs 236 seat within recesses 240 provided in a transverse movable support 242 fixedly secured, as by welding, to the outer free ends of the bifurcated blast-valve cam-operating lever 212.

Figures 14, 15, 16, 17:
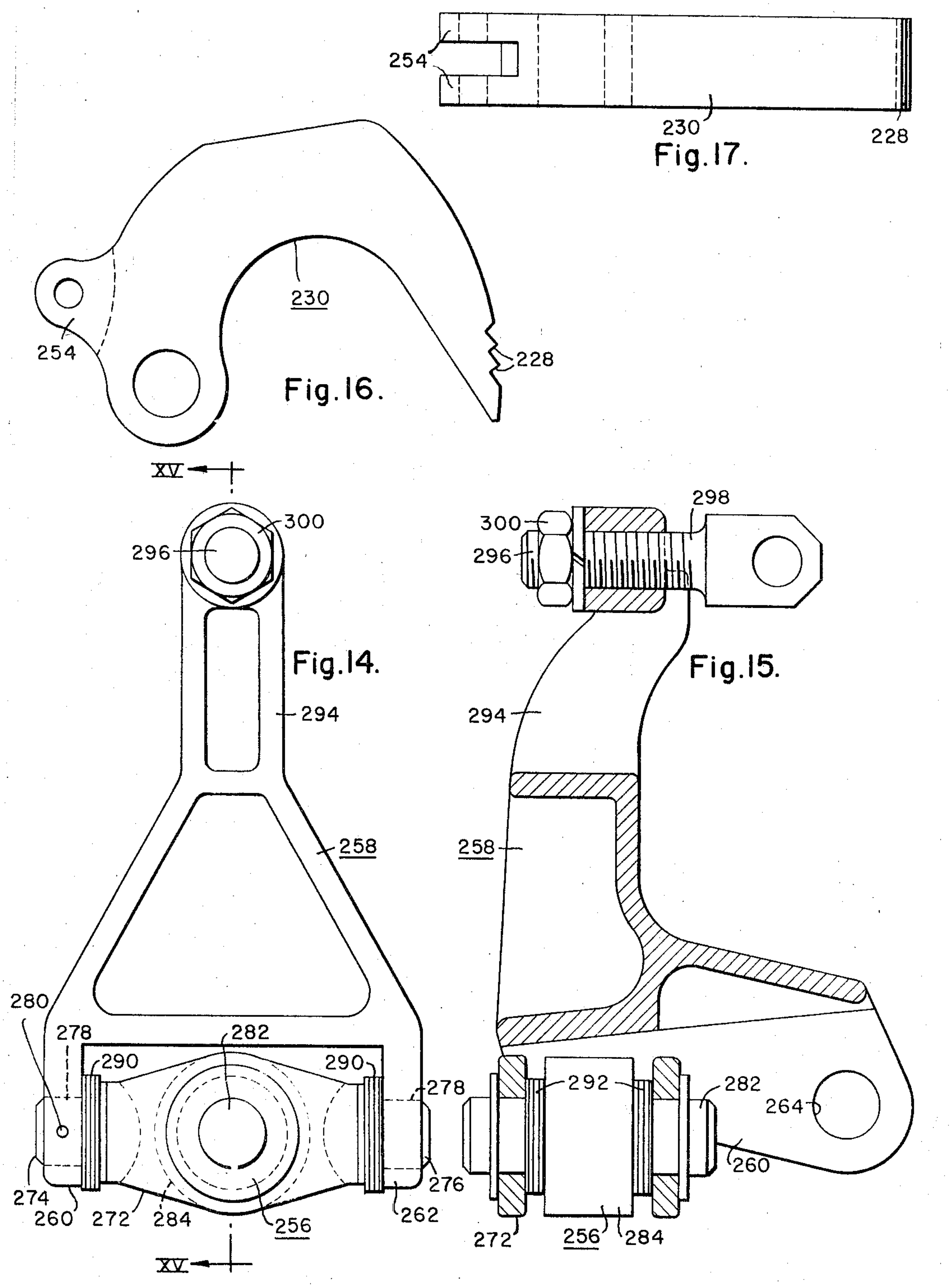
FIG. 14 is a detail front elevational view of the blast-valve operating lever.
FIG. 15 is a vertical sectional view taken substantially along the line XV—XV of the blast-valve operating lever of FIG. 14.
FIG. 16 is an enlarged side elevational view of the blast-valve operating cam.
FIG. 17 is a top plan view of the blast-valve operating cam illustrated in FIG. 16.
Figure 20:
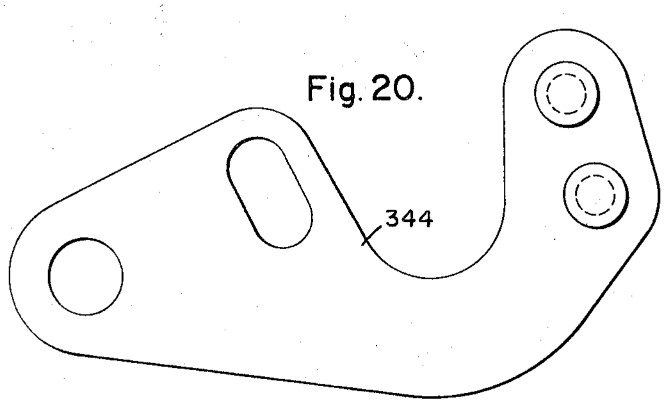
FIG. 20 is a side elevational view of a blast-valve releasing bracket.

During the opening operation, the clockwise opening rotative motion of the main operating lever 138 effects, through straightening of the links 138*c*, 208, counter-clockwise opening motion of the blast-valve cam-operating lever 212, and, as a result, also counterclockwise opening camming motion of the blast-valve cam 230 about the pivot axis 214. This camming action takes place in opposition to the opposing forces exerted by the blast-valve and by a compression spring 244, which seats between an off-jutting bracket portion 246 of the main frame 139 and a spring seat 248 movable with a spring-guide rod assembly 250. The spring-guide rod assembly 250 is pivotally connected by a pivot pin 252 to an apertured bifurcated portion 254 of the pivotally-mounted cam 230. The camming action exerted by the blast-valve cam 230 upon a roller assembly 256, carried by a blast-valve operating lever 258, opens the blast-valve by causing clockwise (FIG. 8) motion of the blast-valve operating lever 258, more clearly shown in FIGS. 14 and 15 of the drawings. With reference to FIGS. 14 and 15 of the drawings, the blast-valve operating lever 258 is of webbed construction for strength, and comprises pivot arms 260, 262 having pivot apertures 264 provided therethrough to accommodate a pivot pin 266 journaled in upstanding stationary supports 268, 270 constituting a portion of the main stationary frame 139.

Figure 8:
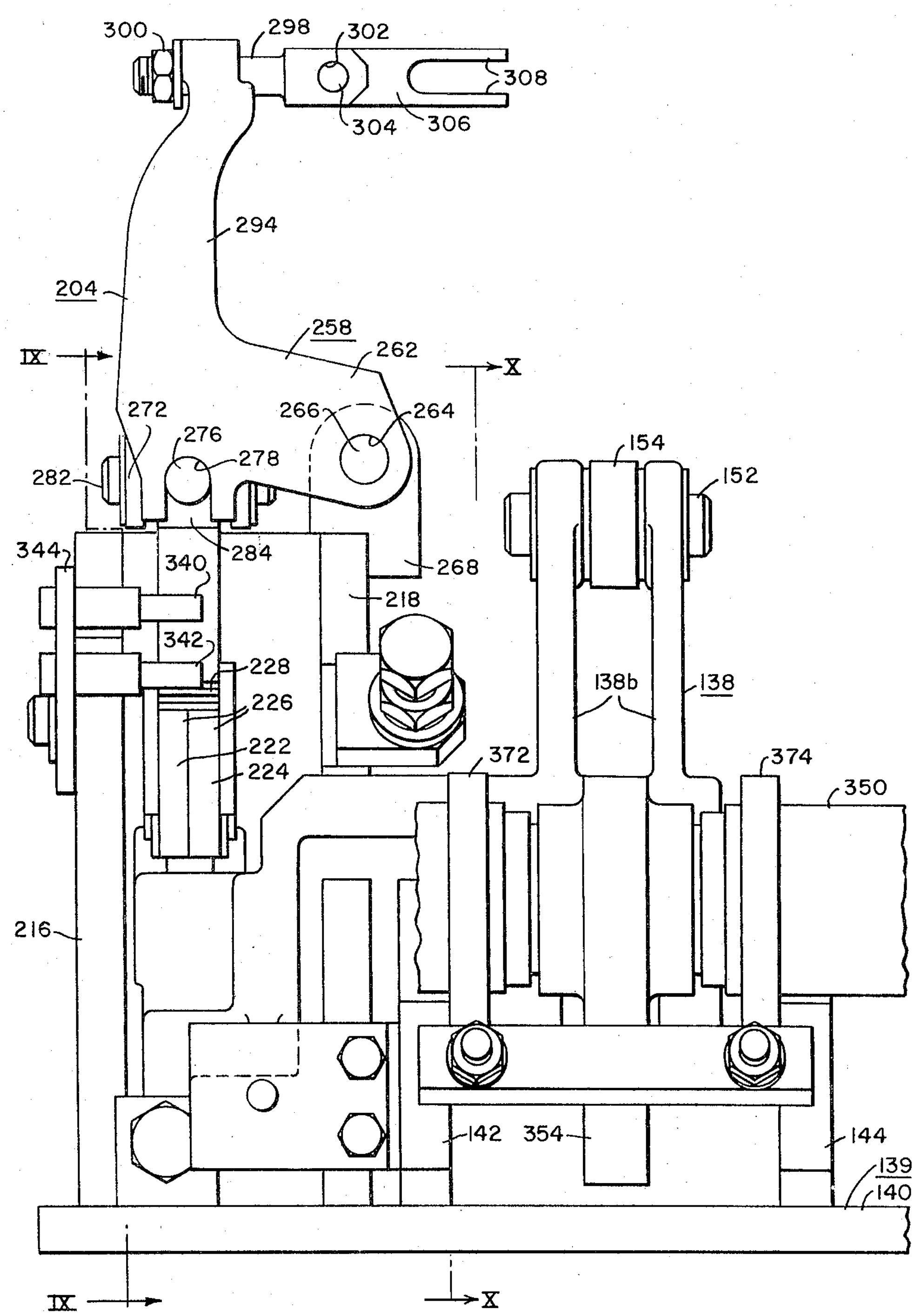
FIG. 8 is an enlarged side elevational view of a portion of the operating linkage and the blast-valve mechanism taken substantially along the line VIII—VIII of FIG. 5.

The roller assembly 256 includes a trunnion 272 having end stub shafts 274, 276, which are journaled within pivot apertures 278 provided adjacent the ends of the arm portions 260, 262 of blast-valve lever 258 and which are held in place by pins 280 (FIGS. 8 and 14). A roller pin 282 rotatively supports a roller 284 and is journaled in side portions of the trunnion 272. Spacing washers or small roller thrust bearings 290, 292 may be utilized in the assembly. The blast-valve operating lever 258, in addition, has an integral upstanding thrust arm 294, which is suitably apertured and tapped to adjustably receive a stud portion 296 of a blast-valve thrust link 298. A locking nut 300 may be used to lock the adjustment once it is properly made.

As viewed more clearly in FIG. 8, the adjustable thrust link 298 has an aperture 302 to receive a pivot pin 304 so as to pivotally connect with a floating thrust link 306 having a bifurcated end portion 308. The furcations straddle a thrust pin 310, which extends through apertures 312 provided in a bifurcated portion 314 of a spring seat 316 carried by the cylindrically-shaped blast-valve 188. FIGS. 7 and 7A may be referred to in this connection.

With reference to FIG. 8, it will be observed that the aforesaid camming action during the opening operation causes clockwise rotative motion of the blast-valve lever 258 to effect, through the thrust linkage 298, 306, inward opening movement of the cylindrically-shaped blast-valve 188, to the position shown in FIG. 7 of the drawings. A blast of high-pressure arc-extinguishing gas 202 will issue from the auxiliary high-pressure reservoir tank 24 through a stationary directional spider support 318, through the blast-valve openings 190, and through the plurality of openings 192 provided in the bearing support 184, which serves as a spindle for rotative motion of the gas-conducting cross-arm assembly 38. FIGS. 6 and 7 more clearly show the directional path for the gas blast.

With particular reference to FIGS. 7 and 7A of the drawings, it will be noted that the high-pressure auxiliary reservoir tank 24 has an opening **24*a* associated therewith, around which is clamped a supporting flange 184*a* integrally formed with the spindle support 184. The stationary support 318 forming part of the blast-valve 188 is secured by a plurality of bolts 320 within tapped holes 322 provided in the flange portion 184*a* of the spindle support 184. The movable blast-valve 188 has a ring-shaped blast-valve seat portion 324, and, in addition, a guide-sleeve portion 326 having a guide ring 328 provided thereon. To cushion the end of the opening motion of the blast-valve 188, there is provided a cushioned seat 330 comprising a plurality of metallic and resilient rings 332, 334, the resilient rings 332 preferably comprising an elastomeric material, such as rubber. In addition, a closing blast-valve spring 336 is provided, being seated upon a seat portion 338 of the guide support 318 and acting upon the spring seat 316 to bias the blast-valve 188** to the closed position.

Figures 9, 33:
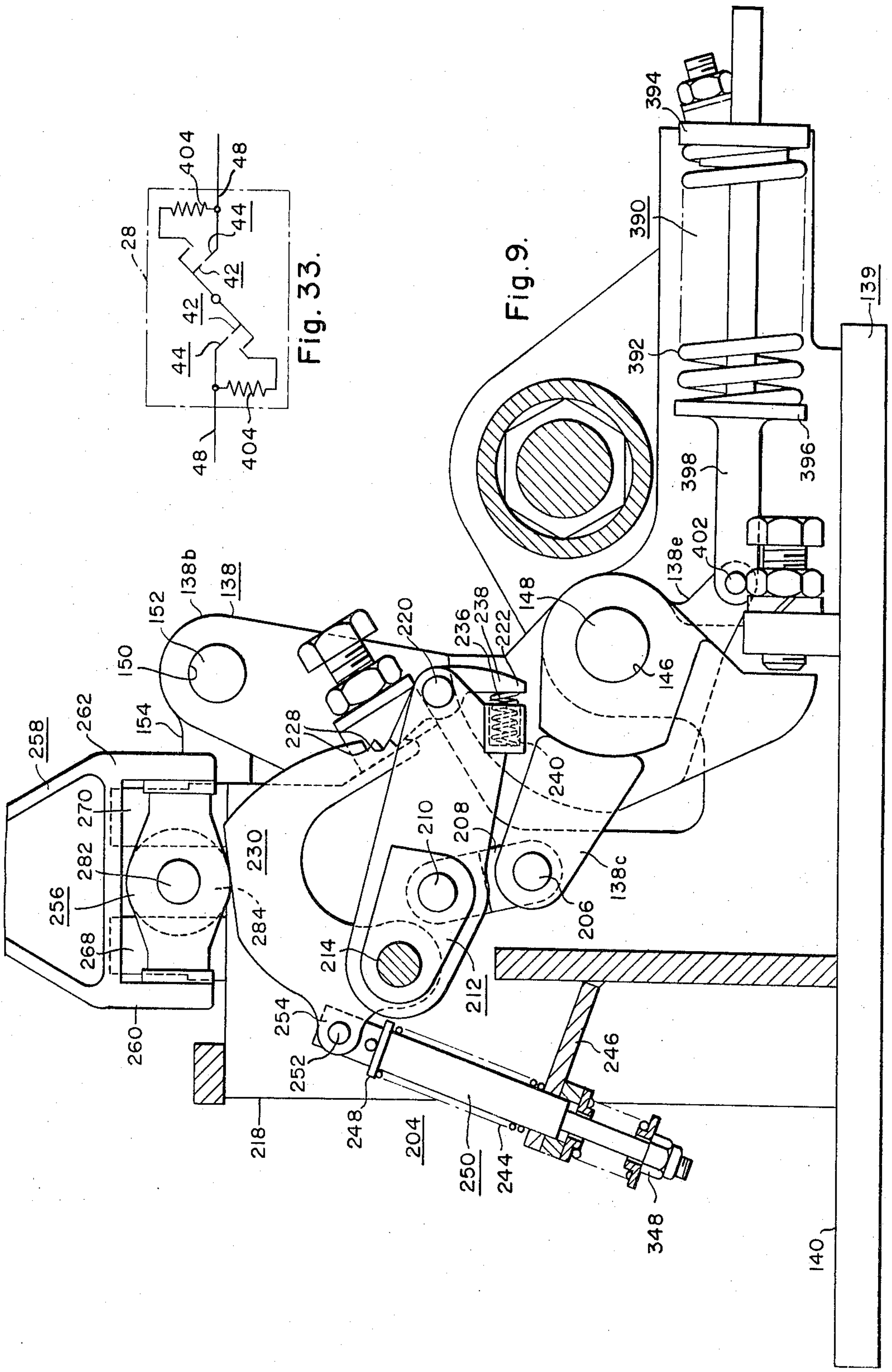
FIG. 9 is a fragmentary enlarged vertical sectional view taken through a portion of the blast-valve linkage, the view being taken substantially along the line IX—IX of FIG. 8.
FIG. 33 is a diagrammatic view of the closing resistor and contact arrangement with the contacts shown in the open position.
Figure 21:
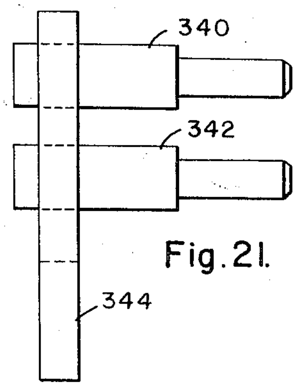
FIG. 21 is an end elevational view of the blast-valve releasing bracket of FIG. 20.

When the circuit-interrupter 10 moves to the closed circuit position, the lever 212 rotating clockwise moves into the position shown in FIG. 9. Toward the end of the closing stroke the dogs 222, 224 drop into notches 228 provided in the cam 230. The two dogs 222, 224 are not identical, one having a slightly longer nose 226 than the other. The differences in length is approximately one-half the distance between two teeth 228 on cam 230 so that when the lever 212 starts to rotate counterclockwise during the opening operation, one or the other of the dogs 222, 224 will engage quickly with the notches 228 in the cam 230. Further movement toward the open position will force the cam 230 against the roller 284 carried by the lever 258 and cause lever 258 to rotate clockwise in the view of FIG. 8. The upper end of this lever 258 carries a link 306, one end of which is slotted, as at 308, and which presses against a pin 310 in the blast-valve 188. Pressure inward on the blast-valve 188 causes it to open. The roller 284 rides upward on the cam 230 until the valve 188 has opened a distance of approximately 1⅜". This permits full flow of the high pressure gas 202 from the reservoir 24 through the blast-valve 188 into the contact arms 40 for the purpose of producing interruption. Further movement of the cam 230 results in no more rise of the roller 284 and no more movement of the blast-valve 188. The movement of the cam 230 and the cam-operating lever 212 continues until the trailing ends 238 of the dogs 222, 224 engage with projections 340, 342 carried by a stationary bracket 344 (FIG. 21) adjustably secured by a bolt 346 to the front support 216 of the main frame 139. These projections 340, 342 engage with the tails 238 of the dogs 222, 224 at an adjustable position before the end of the opening stroke and further movement of lever 212 causes the tails 238 of the dogs 222, 224 to be pressed against the action of the springs 236 so that the noses 226 are withdrawn from the notches 228 in the cam 230. The lever 212 can continue to move with the movement of the main lever 138 until the end position is reached. However, as soon as the dogs 222, 224 are removed from the cam 230, spring 244, which biases the cam 230 will cause it rotate clockwise. As soon as the roller 284 leaves the section of the cam 230 which is circular with respect to the axis 214 about which the cam 230 rotates, the roller 284 in lever 258 will start to move downward, and the blast-valve 188 will close under the action of springs 336 inside the blast-valve 188. The nut 348 (FIG. 9) is so adjusted that with the valve 188 in the closed position, the cam 230 will be held against the roller 284 in lever 258. The breaker 10 stays in this position until a closing operation is initiated, at which time the lever 138 is rotated counterclockwise thereby driving the lever 212 clockwise and again engaging the dogs 222, 224 with the cam 230.

*Torsion accelerating spring-bar assemblage (FIGS. 10, 11)*

Figure 10:
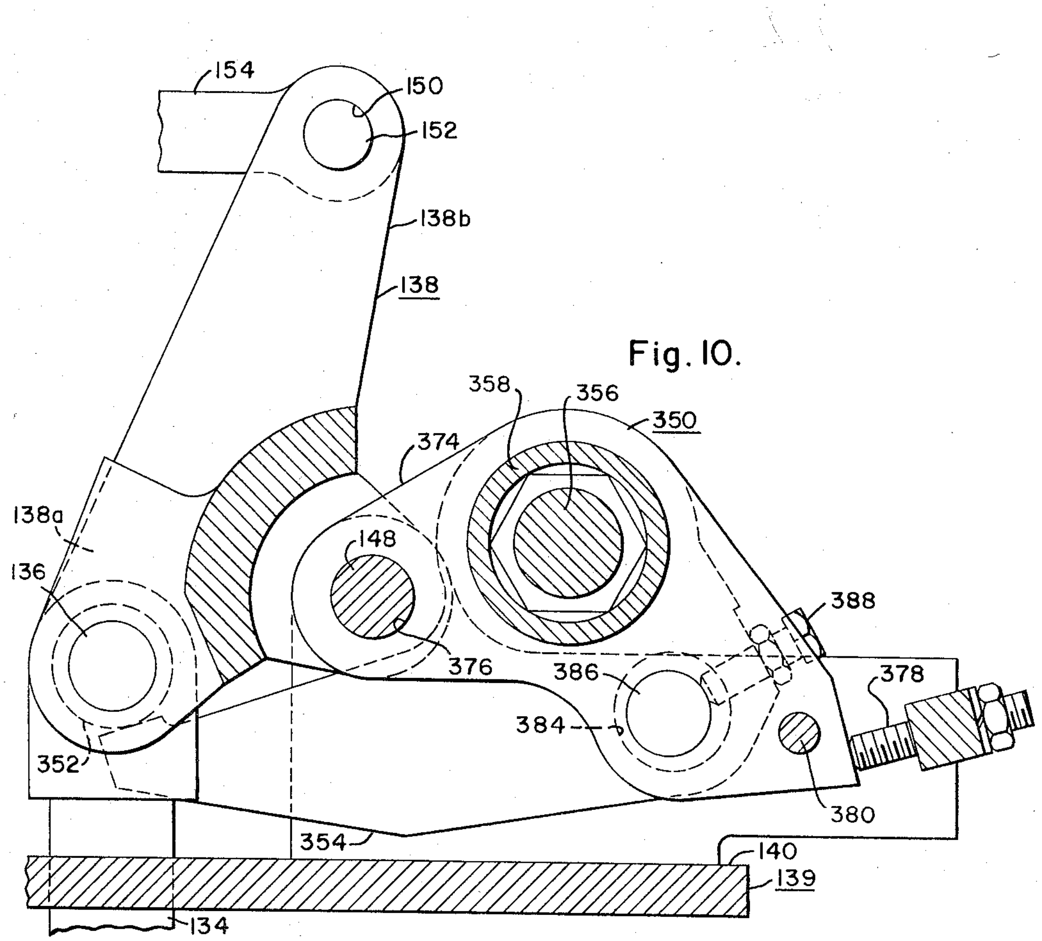
FIG. 10 is an enlarged detailed sectional view of the operating linkage, the view being taken substantially along the line X—X of FIG. 8.
Figure 11:
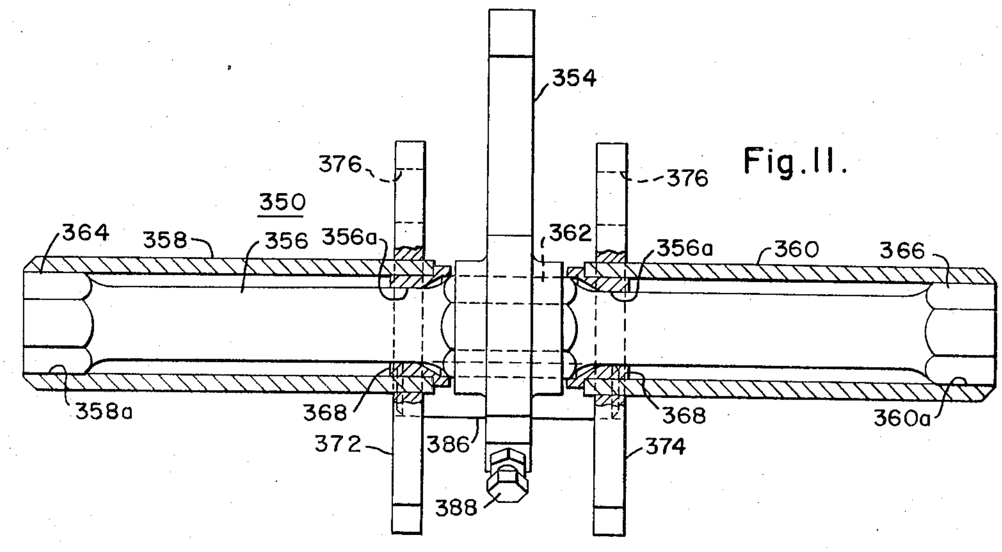
FIG. 11 is a longitudinal sectional view taken through the torsion-bar spring assembly.

To obtain a high initial accelerating opening force for moving the movable contact assemblage 38 to the open-circuit position, and thereby providing high-speed operation of the breaker 10, there is provided an accelerating-spring torsion-bar assemblage, generally designated by the reference numeral 350, and shown more particularly in FIGS. 10 and 11 of the drawings. This spring 350 is one of the key elements in the interrupting head 28 because it stores the energy for the opening of the contacts 42, 44. Energy is stored in it, by the downward closing movement of the operating rod 134. A roller 352 on pin 136 (FIG. 10) engages a torsion lever 354 about a half inch before the closed position is reached, and deflects the outer end of this lever 354 downwardly. The pin 136 carries the roller 352 between one of the arm portions **138*a* and a third arm portion 138*d* (FIG. 27) of the main operating lever 138. This causes a relatively small angular movement in the torsion shaft 356, but this torsion shaft 356 is relatively stiff, and the resisting force at the pin 136 increases from a very low nominal initial load to a final load of approximately 15,000 to 20,000 lbs. Most of the deflection is in the shaft 356. However, a small amount of the deflection does occur in the outer torsion casings or housings 358, 360. The result is that about 85% of the energy is stored in the bar 356, and about 15% in the housings 358, 360.**

On a closing stroke, the torque lever 354 is engaged by the roller 352 which, as it moves downwardly twists the spring or shaft 356. The lever 354 fits around a hexagonal section 362 of this shaft 356 at the mid-point thereof. The outer ends 364, 366 of the shaft 356 are also hexagonal and fit into hexagonal holes **358*a*, 360*a*** in tube assemblies 358, 360. The tube assemblies 358, 360 contain bushings 368 in the vicinity of the lever 354, which permit the round sections **356*a* of the shaft 356 to rotate with respect to the torsion-tube housings 358, 360**.

The two tube assemblies 358, 360 can be rotated about pin 148 for adjustment of the maximum spring load.

The torsion bar 356, is supported by the pair of tubular enclosing torsion housings 358, 360 of steel having welded thereto, adjacent the inner ends thereof, relatively stationary support and clamping plates 372, 374. The support plates 372, 374 have holes 376 extending therethrough, which accommodate the main operating shaft 148 of the interrupter-head 28. The torsion assemblage 350, therefore, may rotate about the main pivot shaft 148 of the interrupter head 28, as defined by certain limits as described hereinafter. The clamping plate 372, 374 position is adjustable within only a narrow range by means of the bolt and locking means 378. After adjustment they are held rigidly in the frame assembly 139 by two bolts 380, 382. This movement provides a control of the maximum force exerted by the spring.

In addition, the support plates 372, 374, as shown in FIG. 10, have enlarged apertures 384 provided therethrough to accommodate, with clearances of a fraction of an inch, a stationary pin 386 held in holes in the main frame 139. An adjustable screw 388, extending through the centrally-disposed torsion lever 354, presses against pin 386 to provide an adjustment of the initial torsion, or loading on the torsion-bar assemblage. The set screw 388 usually bears relatively lightly against the pin 386, just enough to take up slack in the motion.

When the breaker is pulled into the closed position, lever 354 is rotated with respect to the housings 358, 360, and the large holes 384 permit the lever 354 to be rotated while the pin 386 remains stationary in the housings 358, 360. How far the pin 386 moves through the holes 384 depends upon how far the lever 354 is rotated by the downward movement of the vertical operating rod 134 and by the position in which the tubular assemblies 358, 360 are held in the frame 139. The pin 386 is not intended as a stop for this spring 350; there should always be clearance at the holes 384.

To insure that the rotative moving contact assemblage 38 will move completely to the fully open-circuit position, there is additionally supplied a biasing spring assemblage 390 (FIG. 9), comprising a compression spring 392 interposed between a spring seat 394 and a coacting movable spring seat 396, secured by a rod 398 to an operating moving arm **138*e* of the main operating lever 138, as by a pivot pin 402, as more clearly illustrated in FIG. 9 of the drawings. The net result is that during the initial portion of the opening operation, the torsion-bar assemblage 350 provides a high initial opening force, which is buttressed, or augmented by the biasing spring 390** acting through the entire stroke to insure full contact opening.

*Closing resistor assemblages for damping surge voltages on closing operations*

Resistors are not needed in the compressed-gas breaker of the instant invention either to control the rate-of-rise of recovery voltage or to help interrupt line-charging current. However, I have discovered that resistors can be applied in the closing operation to hold switching surges to less than twice normal line-to-ground voltage. Inclusion of such resistors permits system insulation to be reduced to the level required by lightning.

The switching of an unloaded transmission line by a circuit breaker can produce overvoltages of a magnitude up to several times the normal line-to-ground crest value of the voltage. If these voltages are sufficiently high to cause the insulation of the line to break down a line-to-ground fault results. To prevent such faults either the insulation of the line must be made adequately high, or the voltages which are produced by the circuit breaker must be kept below a value which can be withstood by the system insulation. At voltages up to 230 kv. switching surges have in general not been a serious problem. However, at voltages of 500 kv. they are a serious factor because they attain magnitudes which may cause them to produce more faults on a line than would be caused by natural lightning. The cost of a 500 kv. line depends to a considerable extent on the dielectric strength which it must have. Increasing the dielectric strength is done at the cost of increased length of insulators, increased spacing from conductors to towers, higher towers and wider rights-of-way. Consequently, the importance of building a power circuit breaker which will not produce high overvoltages is very important at 500 kv. and higher.

The overvoltages caused by switching can be produced either during the opening of the circuit or during the closing of the circuit. They are produced as part of the transient conditions which exist at these times. On opening operations, the circuit breaker will produce no significant overvoltages if it interrupts the circuit at the time of a normal current zero, and the dielectric strength of the circuit breaker is sufficient to prevent the arc from restriking in the circuit breaker. Slight overvoltages may be produced under these conditions. These are the results of the sequential operation of the poles of the circut breaker and the capacitive coupling between the transmission-line conductors. For instance, the first pole to interrupt the circuit through it will leave that line charged at approximately the normal line-to-ground voltage. The far end of the line may be slightly higher than the point of the line which is being switched because of the Ferranti effect. The trapped charge left on the line when the circuit breaker opens the circuit at a current zero will tend to equalize over the length of the line, and may result in a slight rise in voltage at the terminal of the circuit breaker. In addition to that, the coupling between this disconnected line and the two phases, which are still energized, will result in a $(1-\cos \omega t)$ variation in the line voltage. In the course of the next 60° there will be an increase in the voltage on the disconnected line caused by the coupling to the other two phases. If one phase goes out 60° after the first one, the third phase will continue for approximately another 60° before it is interrupted. However, the voltages produced under these conditions will not be excessive, and will not impose significant extra stress on the insulation of the line.

However, if the opening of the circuit breaker is because of a line-to-ground fault on one of the lines, a shift in the neutral may cause the voltage applied to the other two conductors to be somewhat higher than the normal line-to-ground voltage. In these cases, too, the current will go out at a normal current zero for the voltage which is impressed on the conductor, and the lines may be left at somewhat higher-than-normal potential. If the breaker is reclosed automatically within a few cycles, the voltage across the breaker at the time the circuits are reestablished to unfaulted conductors may be in the order of two and a half times the normal line-to-ground voltage. Under such conditions, and for a worst possible combination of the closing of the three circuits, voltages up to three to four times the normal line-to-ground voltage can be developed on these conductors.

Fortunately, I have discovered that it is possible to limit the voltages which can be produced by the switching surges when a breaker is closed on an unenergized line, or when it is closed on a line which has trapped charges on it as a result of a previous opening operation. These overvoltages are caused primarily by the interaction of the capacitance of the line with the inductance of the source. This produces an oscillatory condition if the line length is very short, and the line capacitance acts like a lumped capacitance. If the line is of significant length, the distributed inductances and capacitances to ground make the line appear not like a simple capacitance to ground, but like a resistance, during the period that it takes a wave of potential to travel down the line to the open end and back. Because the distributed inductance and capacitance act in a manner similar to a resistor to ground during this period, it is common to refer to this property of the line as the "surge impedance." This value of resistance depends, as stated, upon the inductance and capacitance, but it has been found that for lines using single-conductors the surge impedance is about 400 ohms, and for lines having multiple or bundle conductors, the surge impedance is lower, say about 270 to 300 ohms.

The switching surge, which is impressed on the line and travels down to the open end, is, in the case of a simple breaker, equal to the value of the voltage across the pole at the time the arc strikes between contacts in that pole. This would normally be at approximately the crest value of voltage. The wave travels down to the end of the line at approximately the speed of light and then returns. Actually, a current is flowing into the line to charge it up to the crest value of voltage, and this current continues to flow in as the traveling surge proceeds down to the end of the line. At the open end of the line this current no longer can flow, but the energy stored in the inductance of the line tends to keep this current flowing, and, consequently, the voltage doubles at the end of the line and begins to travel back as a traveling wave having a crest value equal to two times the normal line-to-ground voltage. This travels back to the circuit breaker. As stated earlier, the capacitive coupling between the three conductors of a line and the sequential operation of the three poles, possibly caused by the voltages producing breakdowns at slightly different times, can result in the voltage to ground on the line being higher than two-times normal.

If a trapped charge has been left on the line, the change in voltage on the line, produced by the traveling wave, is even greater, and a higher voltage is produced when it is reflected at the end of the line. This is the phenomena which can build the voltage up to three or four times the normal line-to-ground voltage.

I have discovered, however, that if the line is energized, not by connecting it directly to the source bus, but by connecting it to the source bus through a resistor in the circuit breaker, the magnitude of the traveling surge is reduced. It will be equal to the magnitude of the voltage across the circuit breaker at the time the arc is struck multiplied by a factor, which is equal to the surge impedance of the line divided by the sum of the surge impedance of the line and the resistance in the circuit breaker. If for example, these two resistances are equal, the magnitude of the voltage surge which travels down the line will be equal to half of the difference between the potential of the line and the potential of the bus source. If the line is short, and no significant cyclical change occurs in the magnitude of the bus voltage, the traveling surge, which has doubled at the far end of the line and is returning to the source, will come back and have the same value, or nearly the same value as the bus. It will differ from the bus voltage by attenuation of the traveling wave and by the change in the bus voltage, which took place while the wave traveled to the open end of the line and back.

On the basis of a single-conductor line, one may make a calculation of the voltages which would appear on the line as a result of it being energized by a bus, either from a normally-grounded potential, or from the potential resulting from a trapped charge on it. I have discovered that by varying the magnitude of the resistance used in the circuit breaker, it is possible to calculate the voltages which would be impressed on the line if the circuit breaker were equipped with resistors of various magnitudes. In general this resistor should be left in for about a half cycle and then shorted out.

However, transmission-line systems are not quite as simple as the single-phase conditions discussed, and the lines have interphase coupling. The poles close at different points on the voltage waves, and the source does not have zero impedance. To take these various factors into account, analog computer studies have been made using the characteristics of specific transmission lines and specific busses. The operators of the computers have control over the sequence of the closing of the phases and, consequently, it is possible with a very short period of adjustment to determine the worst switching combinations. On one such study the following data was obtained for a 500 kv.-line 100 miles long. The highest voltage was recorded at the receiving end of the line and was registered in a per-unit value based on the actual voltage to ground divided by the normal crest to ground the data is tabulated below:

| Voltage Maximum at the Receiving End of the Line Per-Unit Values | Surge Suppressing Resistor, ohms |
|---|---|
| 3.2 | None |
| 2.1 | 2,400 |
| 2.1 | 1,800 |
| 1.9 | 1,200 |
| 1.7 | 900 |
| 1.5 | 600 |
| 1.4 | 300 |
| 1.7 | 225 |
| 2.1 | 150 |

Similar data was obtained for a line 350 miles long. It was as follows:

| Voltage Maximum at the Receiving End of the Line Per-Unit Values | Surge Suppressing Resistor, ohms |
|---|---|
| 2.8 | None |
| 2.5 | 1,800 |
| 2.2 | 1,200 |
| 2.0 | 600 |
| 1.6 | 300 |
| 1.9 | 150 |

I have discovered that the optimum conditions occurred when the value of the surge-suppressing resistor inserted by the circuit breaker was approximately equal to the 300 ohm surge impedance of the line. It should be noted that if the surge-suppressing resistor were still further reduced in value, it would have less and less effect on the surge which went down the line initially, and eventually as this resistor became zero we would get back to the same condition as is given at the top of the column. In other words, the condition given at the top of the column exists for either a resistor having zero value or infinite value.

The power, which is released in the resistor, depends on the square of the voltage which appears across it divided by the value of the resistance. The energy, which is liberated is equal to this power multiplied by the time the resistor is in the circuit. However, the potential drop and the resistance are not independent variables. This is particularly true when the value of the resistance in the circuit breaker is approximately equal to the value of the resistance in the surge impedance.

Let $e$=voltage drop in the resistor.
$R$=resistance inserted.
$R_s$=surge impedance of the line.
$E_o$=potential difference across breaker when it closes.

$$\text{Power}=\frac{e^2}{R}$$

$$R=kR_s$$

$$e=\frac{E_oR}{R+R_s}=\frac{E_okR_s}{(k+1)R_s}=\frac{E_ok}{k+1}$$

$$\text{Power}=\frac{e^2}{R}=\frac{E_o^2}{R}\frac{(k)^2}{(k+1)}$$

These relations are somewhat over-simplified in that they are assuming infinite bus and a single line from that bus.

Extensive testing with analog computers are required to show the effects of the surge impedance, the lengths of line, the times that the resistors are inserted, and the times they are shorted out, the lengths of line which are switched and the impedances of the sources. An example of results obtained in taking these factors into account are shown on FIG. 34 of the drawings.

Figure 34:
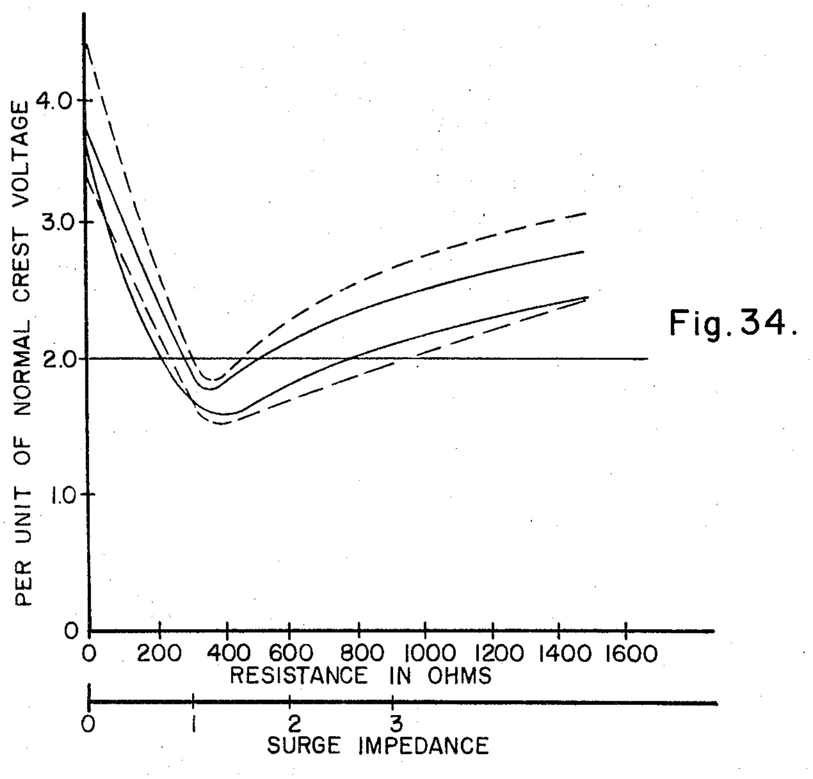
FIG. 34 illustrates curves of surge voltage magnitude as a function of closing resistance values.

In general, too low a resistance results in high voltage because it has little effect on the magnitude of the initial surge traveling down the line, and too high a resistance results in a high surge when it is shunted out. Between these values is an optimum, but the curves in FIG. 34 show that the optimum varies with the source impedance as measured by the magnitude of a bus fault and with the length of line which influences the energy stored in a charged line and the time a wave requires to go out and return. The curves are shown for the conditions which exist following the interruption of a single phase fault and the immediate reclosing before the charges trapped on the unfaulted lines can be discharged.

From the above examples it can be shown that the optimum resistance for use in the circuit breaker is in the range from a value about equal to the surge impedance to a value about three-halves of the surge impedance. The upper limit is somewhat less critical. The choice of the resistance should be on the high side rather than on the low side, because in this range it is less critical, and because the amount of energy released in the resistor is less.

To limit the surge voltages on the line during the closing operation of the circuit-interrupter 10 to a value slightly higher than heretofore mentioned, say to approximately .8 times the per-unit-of-normal-crest voltage, I have discovered that the value of the closing resistance R for each pole unit A, B or C should fall within the range of 1 to 1.3 times the surge impedance of the energized line. If a greater surge voltage is permissible, say of the order of 2 times the per-unit-of-normal-crest-voltage, then the closing resistance R may fall within a larger range, the limits of which may be from 0.9 times the surge impedance to 1.5 times the surge impedance of the energized line. Finally, if a surge voltage of 2.5 times the per-unit-of-normal-crest-voltage is permitted, the range may have broader limits, that is from 0.65 to 2.7 times the surge impedance of the energized line.

Figures 12, 12A, 13:
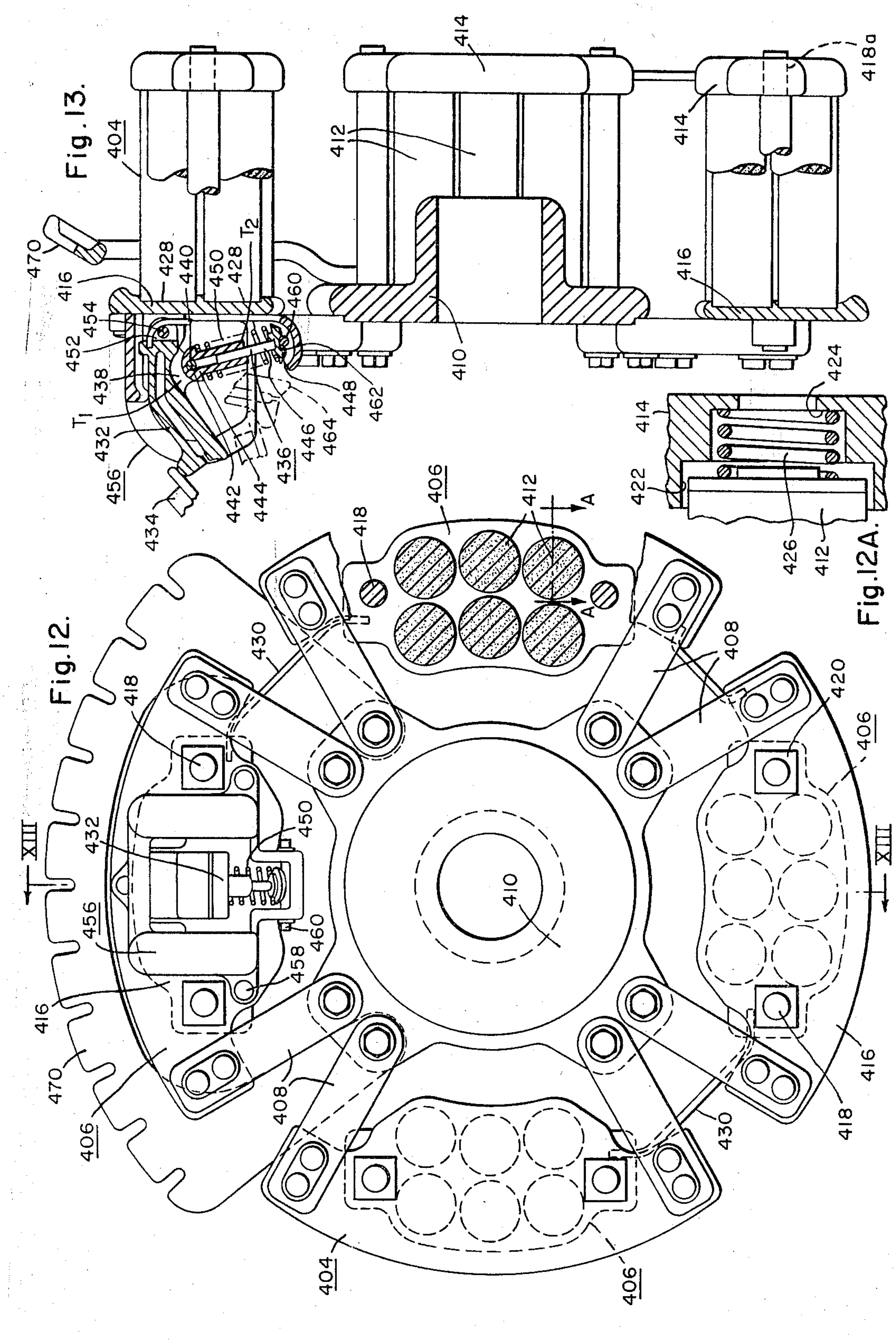
FIG. 12 is a side elevational view of the closing resistor assemblage and the stationary resistor contact taken substantially along the line XII—XII of FIG. 5.
FIG. 12A is an enlarged fragmentary view of a portion of the spring plate of FIG. 12, taken substantially along the line A—A thereof.
FIG. 13 is a vertical sectional view taken substantially along the line XIII—XIII of FIG. 12.

With particular reference to FIGS. 12, 13 and 33 of the drawings, it will be observed that there is provided a pair of serially-related closing-resistor assemblages 404 associated with each interrupting head-unit 28. Each closing resistor assemblage 404 is comprised of four mechanically parallel resistors units 406 secured by radially-outwardly extending insulating straps 408 from a stationary support collar, or bushing 410 threadedly secured and clamped adjacent the internal end of the terminal stud 48 extending through each terminal bushing 50. As shown more clearly in FIG. 12, the mechanically parallel resistor units 406 are disposed circumferentially about the support collar 410 for wide dissemination of the heat, for minimum space requirements and for electrical clearances because each four resistor units 406 are electrically in series.

The resistor units 406 consist of parallel resistor rods 412, held between two conducting plates 414, 416 which are spaced by means of insulating spacing rods 418 having one end 418*a* threadedly secured to the spring seats 414, and having cooperating clamping nuts 420 at the other ends thereof. As more clearly shown in FIG. 12A, the conducting spring seats 414 have positioning cavities 422 and spring-seat cavities 424 provided therein to position, and to maintain under spring pressure, the plurality of parallel-disposed resistor rods 412. Compression springs 426 provide the requisite contact pressure on the resistor rods 412.

The resistor rods 412 may be formed of a molded carbon composition material, as well known by those skilled in the art, and are maintained in a proper position in resistor seats 416 by the provision of suitable recesses 428 (FIG. 13) similar to the positioning recesses 422.

The four individual resistor units 406 each composed of a single resistor seat 416, six parallel resistor rods or elements 412, and a registering spring seat 414, are electrically connected in series, as provided by connectors 430, between the individual resistor units 406. One end resistor unit 406 is electrically connected to the stationary contact 44 and the other end resistor unit 406 is connected to the relatively stationary closing resistor contact 432. The construction is such that during the closing operation, when the resistor assemblages 404 are used, the relatively stationary resistor contacts 432 make engagement with the moving resistor contacts 434 situated at the outer extremities of the cross-arm assembly 38, so that the resistor circuit is made up before contact engagement between the main and movable contact structures 42, 44. Preferably, a toggle linkage 436 is associated with the relatively stationary resistor contact 432, so that inertia effects come into play during the opening operation so that the resistor contacts 432 are opened during the opening operation before separation of the movable and main contact structures 42, 44. As a result, the closing resistances 404 are in the circuit only during the closing operation, and are not in the circuit during the opening operation.

In more detail, the relatively stationary resistor contact 432 comprises a bent split finger-type contact of bifurcated construction for resilience, and having a pair of spaced integral ears 438 having pivot holes 440 therethrough. A pivot pin 442 extends through said pivot holes 440 in the spaced ears and pivotally supports a spring guide 444. The spring guide 444 telescopically receives a spring guide pin 446 having a head portion 448, serving as a spring seat for a toggle-compression spring 450.

The relatively stationary resistor contact 432, in addition, has a pair of spaced integrally-formed ears 452 having pivot holes therethrough to accommodate a pivot pin 454, the ends of which are journaled in pivot recesses provided by a generally bifurcated shielding structure 456 secured by bolts 458 to the upper resistor seat 416, as viewed in FIG. 12. The bifurcated shielding structure 456, in addition, provides pivot holes for a pivot pin 460, which bears in a recess portion 462 of head portion 448 of spring guide pin 446.

From the foregoing, it will be apparent that the toggle linkage 436 comprises the toggle legs $T_1$, $T_2$, which are moved toward more of a dead center in the closed position, as shown by the dotted lines 464 in FIG. 13. As a result, inertia effects are brought into play and because of the extremely fast opening rotative movement of the cross-arm assembly 38, the resistor contacts 432 part company while the main contacts 42, 44 are still in contacting engagement. The net result is that the resistor circuit is immediately opened during the opening operation of the interrupter 10, and the resistance is not in series circuit.

As shown more clearly in FIG. 12, the shielding structure 456 is provided about the relatively stationary resistor contact 432 to minimize the possibility of breakdown between the resistance contact 432 and the outer wall portion of the main exhaust housing 28.

*The use of capacitors to distribute voltage among breaks of a multi-break power circuit breaker*

In a multi-break power circuit breaker the voltages applied across the terminals of a pole unit, A, B or C normally do not divide equally among the series breaks. If the circuit breaker could be built so that the capacitances across the individual breaks were all equal and that the capacitances to ground of the conducting parts between breaks were negligible, there would be a series of equal capacitors connected between different potentials and the voltages applied on them would be equal. In this manner an equal voltage distribution would be obtained. However, in a practical circuit breaker the capacitances across the breaks are not so large with respect to the capacitances to ground that the capacitances to ground can be neglected. By increasing the capacitances across the interrupters by adding capacitors, the capacitances to ground can be made relatively less effective and the voltage distribution approaches uniformity. However, to obtain approximately uniform distribution among the breaks in this manner requires the addition of very large capacitors.

A non-uniform distribution of smaller capacitors paralleling the interrupters may be used to improve the voltage distribution although it will not make it uniform. Power circuit breakers may have faults on either side and consequently must be symmetrical or approximately symmetrical so that they will respond in the same manner regardless of which terminal is energized and which terminal grounded. Since the maximum voltage tends to appear across the interrupter adjacent to the terminal which is energized I have discovered that it is possible to reduce the maximum voltage on any one interrupter by applying a larger capacitor across the end interrupters 28. In the case of a four-break circuit breaker, the two end interrupters of a pole should have more capacitance added across them than the two inner interrupters. In the case of a power circuit breaker having six interrupters in series, I have discovered that the two end ones might have the largest capacitors in parallel with them and the second and fifth break might have smaller size capacitors across them with still smaller capacitors connected across the third and fourth breaks. The relative values of the capacitors depend upon the relative capacitances across the individual interrupters and between the interrupters and ground.

For a pole unit having six breaks in series the calculated voltage distribution without capacitors across the six breaks was 67.1, 17.8, 10.1, 2.7, 1.6 and 0.6%, respectively. The most highly-stressed break is stressed four times the average for the six breaks. By applying capacitors across each of the six breaks with the two end breaks being paralleled by higher capacitances than the others, the voltage distribution was improved to measured values of 20.5, 19.5, 18.0, 15.4, 15.0 and 11.6%, respectively. In this pole-unit the most highly stressed break is stressed only 1.23 times the average for the six breaks.

In this breaker the capacitor units 466 can be mounted inside the interrupter-head unit 28 where they are provided with a surrounding insulating medium and protection from the weather. They may consist of a plurality of capacitor rods 468 in parallel connected electrically between the inner extremities of the terminal bushings 50 on an arcuate conducting plate 470 and the metallic exhaust housing 28, as at 472 (FIG. 3) so that each of the interrupting breaks 42, 44 will have a voltage-dividing impedance shunting such break. By way of example, and not by way of limitation, 900 micro-microfarads are disposed across the outer breaks, and only 700 micro-microfarads are utilized in the shunting impedance controlling the intervening breaks, as more clearly shown in FIG. 31 of the drawings.

Figure 31:
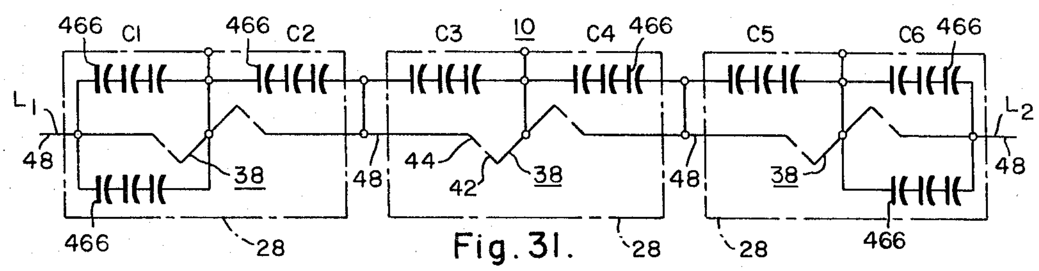
FIG. 31 is a diagrammatic view illustrating an improved voltage-dividing impedance arrangement for a multiple-break type of circuit interrupter, embodying principles of the present invention.

With further reference to FIG. 31, should $C_2$ not be equal to $C_3$, then the following conditions should prevail:

$$C_1=C_6$$
$$C_2=C_5$$
$$C_3=C_4$$
$$C_1>C_2>C_3$$

*Gas-supply system*

Generally, the compressed-gas circuit interrupter 10 of the present invention can be used with any suitable high-pressure gas. Preferably, however, it is desired to use a highly efficient gas, such as sulfur hexafluoride ($SF_6$) gas 202, which may be at a high pressure of say, for example, 240 p.s.i.g. The exhaust tank pressure, as present within the exhaust housing 28, and within the insulating column structures 22, will be at substantially 45 p.s.i.g. As is usual with such types of interrupters, preferably a compressor, not shown, is supplied to effect recompression of the low-pressure $SF_6$ gas 202 to the requisite high-pressure level, at which it is stored within the longitudinally-extending main reservoir tanks 18.

From the foregoing description, it will be apparent that there is provided an improved and simplified type of high-voltage compressed-gas circuit interrupter 10 readily adapted, by use of a modular construction 28, to high-voltage ratings. For a 500 kv. rating, three such modular heads 28 are provided. For higher voltages, additional heads 28 could be provided; for example, 700 kv. might require four heads 28 and correspondingly longer vertical insulating columns 22. 345 kv. breakers may use only two heads 28 on correspondingly shorter insulating columns 22.

The use of the individual interrupting heads 28 thus enables the circuit-interrupting structure 10 to be adaptable to a wide line of voltage ranges say, for example, and not by limitation, from voltages of 345 kv. up to 700 kv. and even higher. It will be noted that the interrupting head-units 28 with the rotating cross-arm assemblages 38 result in an extremely compact construction enabling high-speed operation, such as two-cycle operation, to be achieved with a minimum of inertia of the rotating parts. Gas-flow conditions during interruption are controlled in the most effective manner to result in highly-effective interrupting conditions being brought simultaneously upon the two serially related arcs 46 established in each of the interrupting head-units 28.

The particular construction utilized results in there being no necessity for employing extremely high compressed-gas pressures, say, for example, 1000 p.s.i., as is necessitated in some circuit-interrupting constructions. In addition, the use of a highly-effective insulating and arc-extinguishing gas 202, such as sulfur-hexafluoride ($SF_6$) gas enables the spacing distances within the interrupting head-units 28 to be maintained at a minimum, and, in addition, results in fast circuit interruption making two-step switching unnecessary on interruption.

As has been described herein, the utilization of closing resistances R only on the closing stroke of the interrupter 10 results in a damping of the surge voltages impressed on the line during closing operation; yet, the avoidance of the use of such resistances R during the opening operation eliminates two-step opening switching and thereby results in extremely high-speed complete clearing of the circuit. It also makes it unnecessary to provide for the much greater thermal duty on the resistors 412, which would be imposed by their use during opening operations.

The employment of the accelerating-spring assemblage, as a torsion-bar arrangement 350, results in extremely high initial accelerating opening forces with a minimum of inertia of the utilized parts. Finally, it will be noted that the particular arrangement and location of the closing resistance assemblages 404 results in a space-saving arrangement and a wide dissenmination of the generated heat in the resistor assemblages 404. The torsion-bar assemblage 350 and the details of the blast-valve linkage 204 are claimed in United States patent application filed June 12, 1964, Serial No. 374,709, by Roswell C. Van Sickle, Wayne Aspey and Russell N. Yeckley, and assigned to the assignee of the instant application.

The varying of the shunting capacitance across the individual serially-related breaks results in a favorable distribution of voltage among the breaks 42, 44 during the opening operation of the circuit interrrupter 10.

In conclusion, there results a circuit interrupter 10 of extremely high-speed operation and capable of ready maintenance with a minimum number and weight of moving parts associated with the movable contact assemblage 38. The particular location and arrangement of the compressed-gas blast-valve structure 188 associated with the support spindle, or bearing-and-blast-valve support 184 results in a minimum of time necessary for the gas blast 202 to flow into the intercontact region for fast circuit interruption.

It will be noted that in the fully-open circuit position of the interruptor 10, there is only voltage stress on the capacitor units 466 and terminal bushings 50. There is an open gap distance between the separated contact assemblages 42, 44 with no parallel insulation subjected to voltage stress. This fact is extremely important.

Although there has been illustrated and described specific structures, it is to be clearly understood that the same were namely for the purpose of illustration, and that changes and modifications may readily be made therein by those skilled in the art without departing from the spirit and scope of the invention.

I claim as my invention:

1. A high-voltage compressed-gas circuit interrupter including an upstanding insulating column structure, an insulating operating rod extending upwardly interiorly of said column structure, an interrupting head surmounted upon said column structure and having a pair of terminal bushings extending therewithin, a pair of spaced stationary contacts secured to the interior ends of the terminal bushings, a rotative hollow cross-arm bridging contact assembly adaptable for rotation in a single direction about an axis, said rotative bridging contact assembly making separable engagement with the pair of spaced stationary contacts, operating crank means interconnecting the upper end of said insulating operating rod with said rotative bridging cross-arm assembly, and a blast valve disposed adjacent the hub portion of the rotative bridging contact assembly for controlling an outward flow of high-pressure gas through the opposed hollow arms of said assembly.

2. A compressed-gas circuit interrupter including an upstanding insulating column structure, an insulating operating rod extending upwardly interiorly of said column structure, an interrupting head surmounted upon said column structure and having a pair of terminal bushings extending therewithin, a pair of spaced stationary contacts secured to the interior ends of the terminal bushings, means defining a bearing and blast-valve support disposed generally centrally and interiorly of said interrupting head, a rotative hollow cross-arm bridging contact assembly rotatively mounted on said support and adaptable for rotation thereabout, said rotative bridging contact assembly making separable engagement with the pair of spaced stationary contacts, operating crank means interconnecting the upper end of said insulating operating rod with said rotative bridging cross-arm assembly, a blast-valve structure disposed within said support portion of the rotative cross-arm bridging contact assembly, and means interrelating rotative contact motion with blast-valve operation.

3. The combination according to claim 2, wherein the cross-arm bridging assembly has hollow gas-conducting arms to transmit a blast of gas from said support portion to the region between the separated contacts.

4. In combination, a circuit interrupter including means defining a pair of spaced relatively stationary main contacts, a stationary impedance contact connected through an impedance with each relatively stationary main contact, and rotative bridging main contact means having movable impedance contacts at the outer free extremities thereof for first making closing engagement with the stationary impedance contacts prior to a subsequent closing engagement with the spaced relatively stationary main contacts, and means providing separation of both pairs of separable impedance contacts during the opening operation of the circuit interrupter prior to separation of both pairs of separable main contacts.

5. A circuit interrupter for energizing a line including a pair of separable main contacts, means defining an impedance contact connected to one of said separable main contacts through a closing resistance R, means electrically connecting the other of said separable main contacts first with said impedance contact and then subsequently with said one contact during a closing operation, the value of said closing resistance falling within the range of 1 to 1.3 times the surge impedance of the energized line, and means keeping said closing resistance out of the circuit during the opening operation.

6. A circuit interrupter for energizing a line including a pair of separable main contacts, means defining an impedance contact connected to one of said separable main contacts through a closing resistance R, means electrically connecting the other of said separable main contacts first with said impedance contact and then subsequently with said one contact during a closing operation, the value of said closing resistance falling within the range of .9 to 1.5 times the surge impedance of the energized line, and means keeping said closing resistance out of the circuit during the opening operation.

7. A circuit interrupter for energizing a line including a pair of separable main contacts, means defining an impedance contact connected to one of said separable main contacts through a closing resistance R, means electrically connecting the other of said separable main contacts first with said impedance contact and then subsequently with said one contact during a closing operation, the value of said closing resistance falling within the range of 0.65 to 2.7 times the surge impedance of the energized line, and means keepings said closing resistance out of the circuit during the opening operation.

8. A circuit interrupter for energizing a line including a pair of separable main contacts, means defining an impedance contact connected to one of said separable main contacts through a closing resistance R, means electrically connecting the other of said separable main contacts first with said impedance contact and then subsequently with said one contact during a closing operation, and means for keeping the closing resistance R out of the circuit during the opening operation of the circuit interrupter.

9. A circuit interrupter including a substantially closed metallic interrupting casing having a pair of terminal bushings extending therewithin, means defining a gas-reservoir chamber disposed adjacent the central portion of the casing and also adjacent a wall portion thereof, said gas-reservoir chamber having a protruding gas-conducting bearing portion affixed thereto, a pair of stationary contacts secured to the inner ends of said terminal bushings, a rotative bridging cross-arm contact assembly rotatively supported on said gas-conducting bearing portion and carrying a pair of movable contacts at the outer free ends thereof, said rotative cross-arm assembly having gas-conducting arms, the movable contacts being separable from the stationary contacts to establish a pair of serially-related arms, and blast-valve means disposed internally of said bearing portion for controlling a blast of gas through the gas conducting arms to effect arc extinction.

10. A circuit interrupter including a substantially closed metallic interrupting casing having a pair of terminal bushings extending therewithin, means defining a gas-reservoir chamber disposed adjacent the central portion of the casing and also adjacent a back wall portion thereof, said gas-reservoir chamber having a protruding gas-conducting bearing portion affixed thereto, a pair of stationary contacts secured to the inner ends of said terminal bushings, a rotative bridging cross-arm contact assembly rotatively supported on said gas-conducting bearing portion and carrying a pair of movable contacts at the outer free ends thereof, said rotative cross-arm assembly having gas-conducting arms, the movable contacts being separable from the stationary contacts to establish a pair of serially-related arcs, and blast-valve means disposed internally of said bearing portion for controlling a blast of gas through the gas conducting arms to effect arc extinction.

11. A circuit interrupter including an interrupter casing having a pair of terminal bushings extending therewithin, a stationary main contact and a stationary resistance contact supported on the inner end of each terminal bushing, resistance means extending generally around the end of each terminal bushing and connected between the stationary main and resistance contact of each terminal bushing, bridging contact means including a pair of movable contacts for bridging the two main stationary contacts in the closed-circuit position of the interrupter, said bridging contact means including conducting portions for engaging said two stationary resistance contacts, said bridging contact means closing the circuit during the closing operation through the two stationary resistance contacts prior to the closing of the circuit through the two stationary main contacts, and means providing a separation between said conducting portions of the bridging contact means and the two stationary resistance contacts during the opening operation prior to separation of the main contacts.

12. A circuit interrupter including an interrupter casing having a pair of terminal bushings extending therewithin, a stationary main contact and a stationary resistance contact supported on the inner end of each terminal bushing, resistance means extending generally around the end of each terminal bushing and connected between the stationary main and resistance contact of each terminal bushing, bridging contact means including a pair of movable contacts for bridging the two main stationary contacts in the closed-circuit position of the interrupter, said bridging contact means closing the circuit during the closing operation through the two stationary resistance contacts prior to the closing of the circuit through the two stationary main contacts, and means preventing the inclusion of the resistance means in the circuit during the opening operation.

13. In combination, means defining a pivotally-mounted relatively stationary resistance contact, opening biasing means for said stationary resistance contact including toggle means, means defining a relatively stationary main contact, closing resistance means interconnecting said two relatively stationary contacts, moving contact means including a moving contact portion making contacting engagement with said pivotally-mounted relatively stationary resistance contact to carry the toggle means to more of a dead-center toggle position, whereby during the opening operation, the inertia of the resistance contact will maintain the resistance circuit open and thereby exclude the resistance from the circuit during the opening operation.

14. The circuit interrupter combination of claim 4, wherein the rotative bridging main contact means has a hub portion and gas-conducting hollow arms, a high-pressure reservoir chamber, and a blast valve is disposed adjacent said hub portion to control a radial outward flow of compressed gas through said hollow arms.

15. The combination according to claim 9, wherein an impedance contact is associated with each stationary contact through a closing resistance R, and means are provided to electrically connect the respective movable contact first with the respective impedance contact and then subsequently with the respective stationary contact during the closing operation, and means keeping said closing resistance out of the circuit during the opening operation of the interrupter.

16. The combination of claim 12, wherein the bridging contact means has hollow gas-conducting arms and a hub portion, a high-pressure reservoir chamber is provided, and a blast valve for controlling an outward flow of gas through the arms is provided adjacent said hub portion.

References Cited by the Examiner

UNITED STATES PATENTS

| | | | |
|---|---|---|---|
| 2,748,226 | 5/1956 | MacNeill et al. | 200—148 |
| 2,783,337 | 2/1957 | Beatty et al. | 200—148 |
| 3,017,480 | 1/1962 | Klaassen | 200—146 |
| 3,091,678 | 5/1963 | Leeds | 200—148 |
| 3,214,550 | 10/1965 | Easley | 200—148 |

FOREIGN PATENTS

| | | |
|---|---|---|
| 721,386 | 6/1942 | Germany. |
| 732,879 | 3/1943 | Germany. |
| 463,355 | 3/1937 | Great Britain. |
| 649,547 | 9/1928 | France. |
| 902,181 | 11/1944 | France. |
| 980,002 | 12/1950 | France. |
| 310,618 | 1/1956 | Switzerland. |

ROBERT K. SCHAEFER, *Primary Examiner.*

ROBERT S. MACON, *Examiner.*

Dedication 3,291,947.—*Roswell C. Van Sickle,* Wilkinsburg, Pa. INTERRUPTING STRUCTURES FOR COMPRESSED-GAS CIRCUIT INTERRUPTERS HAVING DOUBLE-BREAK HOLLOW ROTATIVE MOVING CONTACT-ARM ASSEMBLY. Patent dated Dec. 13, 1966. Dedication filed July 20, 1981, by the assignee, *Westinghouse Electric Corp.*

Hereby dedicates to the Public the remaining term of said patent.

[*Official Gazette October 13, 1981.*]